(12) United States Patent
Auyang et al.

(10) Patent No.: US 11,877,622 B2
(45) Date of Patent: *Jan. 23, 2024

(54) FOOTWEAR STROBEL WITH BLADDER AND LASTING COMPONENT AND METHOD OF MANUFACTURING

(71) Applicant: NIKE, Inc., Beaverton, OR (US)

(72) Inventors: Arick Auyang, Portland, OR (US);
Derek Houng, Portland, OR (US);
Jason R. Meeker, Hillsboro, OR (US);
Eric A. Schmalzer, Portland, OR (US);
Jeffrey S. To, Portland, OR (US);
Geoffrey A. Weston, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,681

(22) Filed: Jan. 20, 2022

(65) Prior Publication Data

US 2022/0132985 A1 May 5, 2022

Related U.S. Application Data

(62) Division of application No. 16/427,998, filed on May 31, 2019, now Pat. No. 11,253,026.

(Continued)

(51) Int. Cl.
*A43B 9/02* (2006.01)
*A43B 13/20* (2006.01)
(Continued)

(52) U.S. Cl.
CPC ............... *A43B 13/20* (2013.01); *A43B 9/02* (2013.01); *A43B 13/04* (2013.01); *A43B 13/186* (2013.01);

(Continued)

(58) Field of Classification Search
CPC .. A43B 9/02; A43B 9/06; A43B 13/20; A43B 13/38; A43B 13/386; A43B 13/39; A43B 13/40; A43D 3/022
See application file for complete search history.

(56) References Cited

U.S. PATENT DOCUMENTS

| | | | | | |
|---|---|---|---|---|---|
| 1,346,146 | A | * | 7/1920 | Warren | A43D 3/022 36/43 |
| 3,302,313 | A | * | 2/1967 | Isaacson | A43D 3/022 36/43 |
| 3,431,570 | A | * | 3/1969 | Murphy | A43B 3/14 36/11 |
| 3,935,609 | A | * | 2/1976 | Brotchie | A43D 3/022 12/128 D |

(Continued)

FOREIGN PATENT DOCUMENTS

| | | |
|---|---|---|
| CN | 1280802 A | 1/2001 |
| CN | 103126187 A | 6/2013 |
| DE | 202016106142 U1 | 11/2016 |

*Primary Examiner* — Sharon M Prange
(74) *Attorney, Agent, or Firm* — Quinn IP Law

(57) ABSTRACT

An article of footwear includes a strobel that has a polymeric bladder defining an interior cavity and configured to retain a fluid in the interior cavity. The polymeric bladder has a peripheral flange extending around at least a portion of a perimeter of the interior cavity. A tensile component is disposed in the interior cavity and is secured to opposing inner surfaces of the polymeric bladder. The peripheral flange defines a groove extending along the peripheral flange. The strobel also includes a lasting component configured to extend along the peripheral flange around the at least a portion of the perimeter of the interior cavity. The lasting component is secured to the peripheral flange. A method of manufacturing footwear that includes the strobel is disclosed.

8 Claims, 27 Drawing Sheets

Related U.S. Application Data

(60) Provisional application No. 62/678,458, filed on May 31, 2018.

(51) Int. Cl.
*A43B 13/40* (2006.01)
*A43D 3/02* (2006.01)
*A43B 13/04* (2006.01)
*A43B 13/18* (2006.01)
*A43B 13/28* (2006.01)
*B29D 35/14* (2010.01)
*A43B 13/39* (2006.01)
*A43B 23/02* (2006.01)

(52) U.S. Cl.
CPC .............. *A43B 13/28* (2013.01); *A43B 13/39* (2013.01); *A43B 13/40* (2013.01); *A43D 3/022* (2013.01); *B29D 35/142* (2013.01); *A43B 23/0205* (2013.01)

(56) References Cited

U.S. PATENT DOCUMENTS

| | | | | |
|---|---|---|---|---|
| 4,183,156 | A | * | 1/1980 | Rudy ................... A43B 13/40 36/44 |
| 5,733,647 | A | * | 3/1998 | Moore, III ........... A43B 7/1464 36/43 |
| 2008/0276490 | A1 | * | 11/2008 | Holt ..................... B29D 35/124 36/28 |
| 2010/0180466 | A1 | * | 7/2010 | Ho ........................... A43B 9/06 36/16 |
| 2012/0023686 | A1 | * | 2/2012 | Huffa ................... A43B 23/025 12/145 |
| 2012/0260526 | A1 | * | 10/2012 | Smith .................... A43B 13/20 36/83 |
| 2013/0091729 | A1 | * | 4/2013 | Lagneau ................ A43B 13/20 36/43 |
| 2015/0374070 | A1 | * | 12/2015 | Tawney ................... A43B 1/14 36/87 |
| 2019/0045880 | A1 | * | 2/2019 | Li ........................ B29D 35/148 |
| 2019/0365046 | A1 | * | 12/2019 | Calle .................... A43B 23/025 |

* cited by examiner

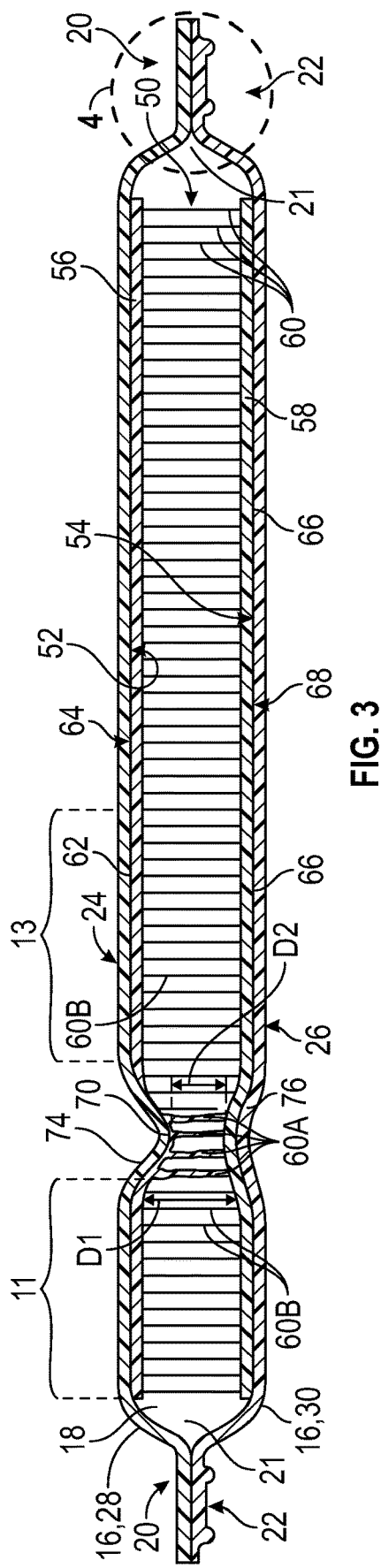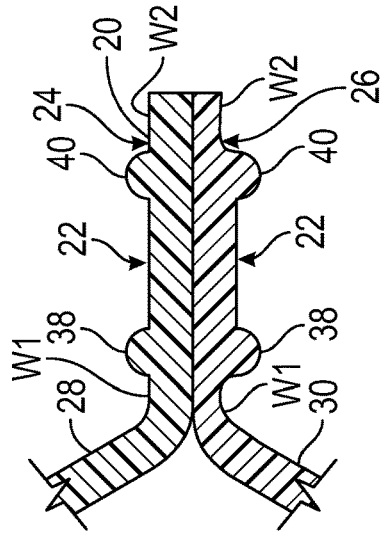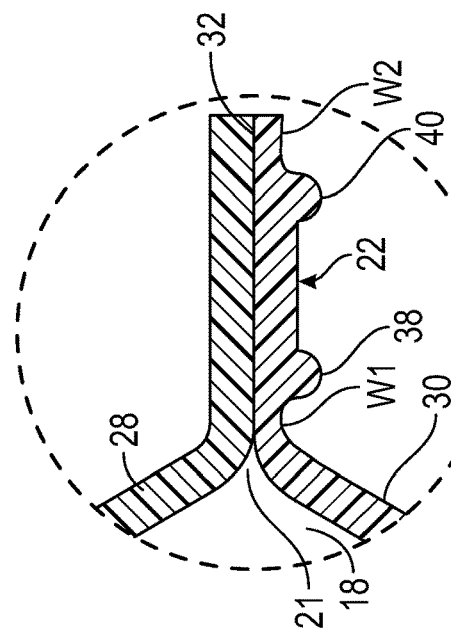

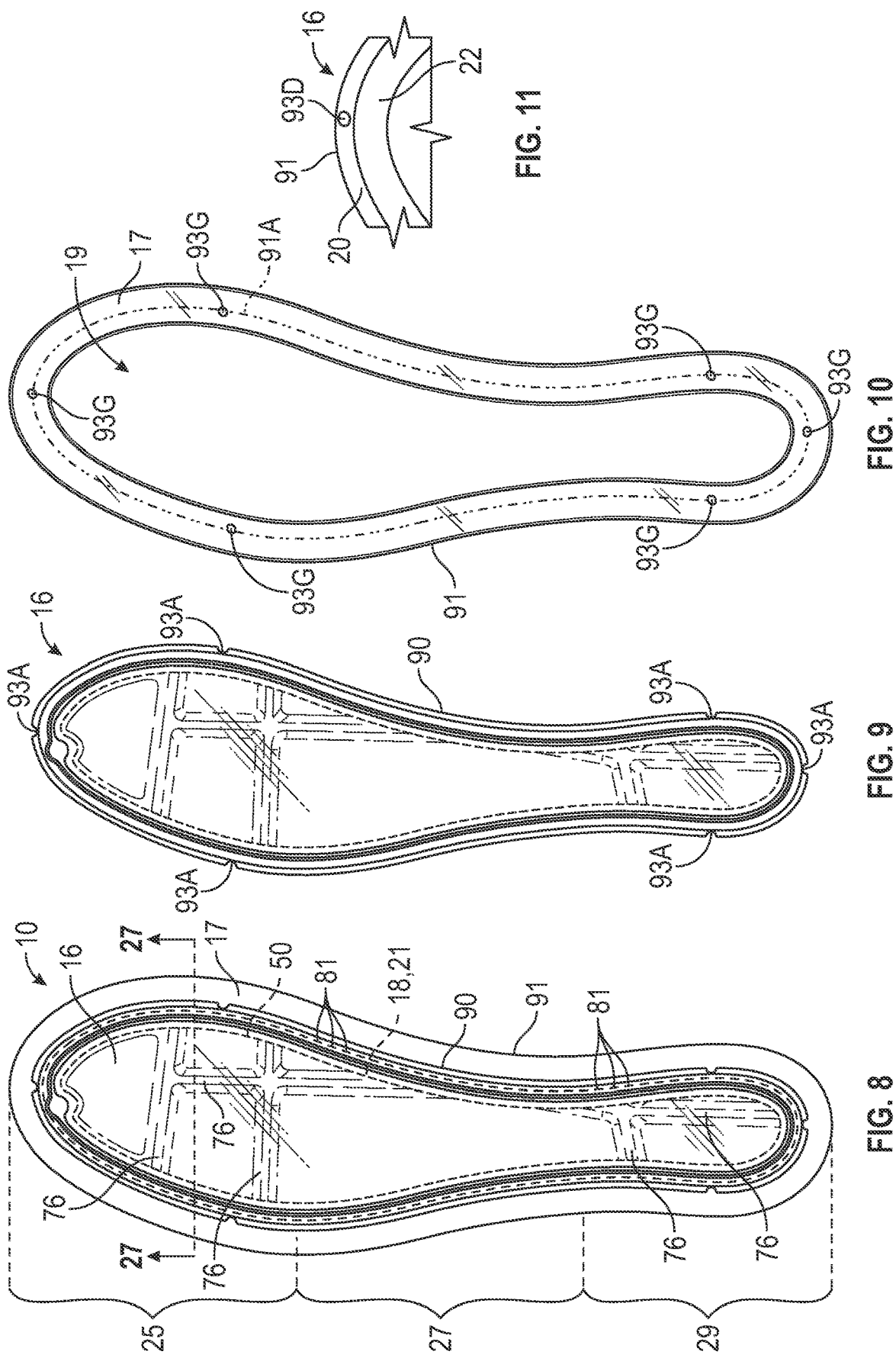

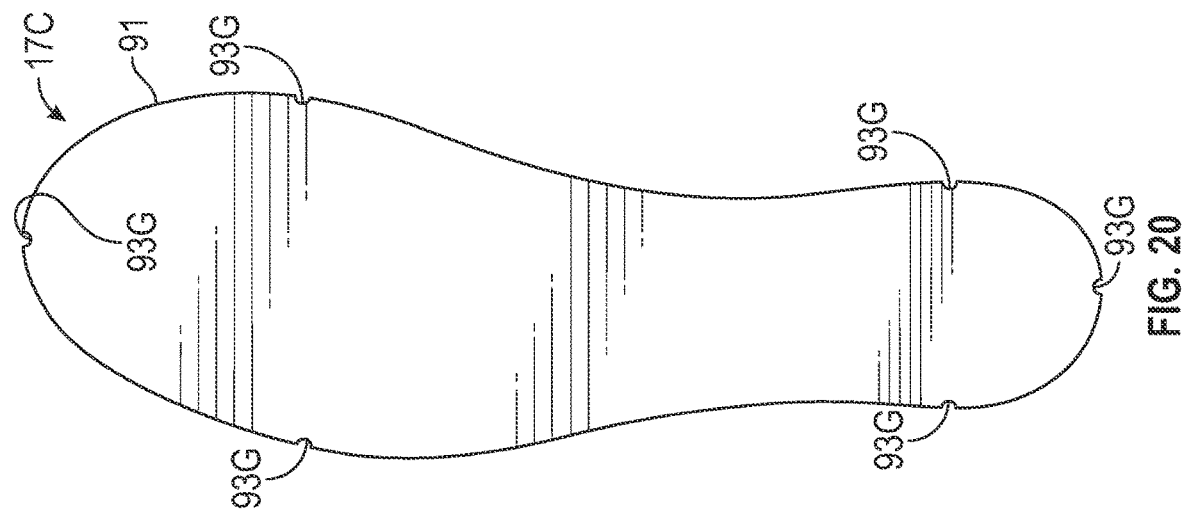
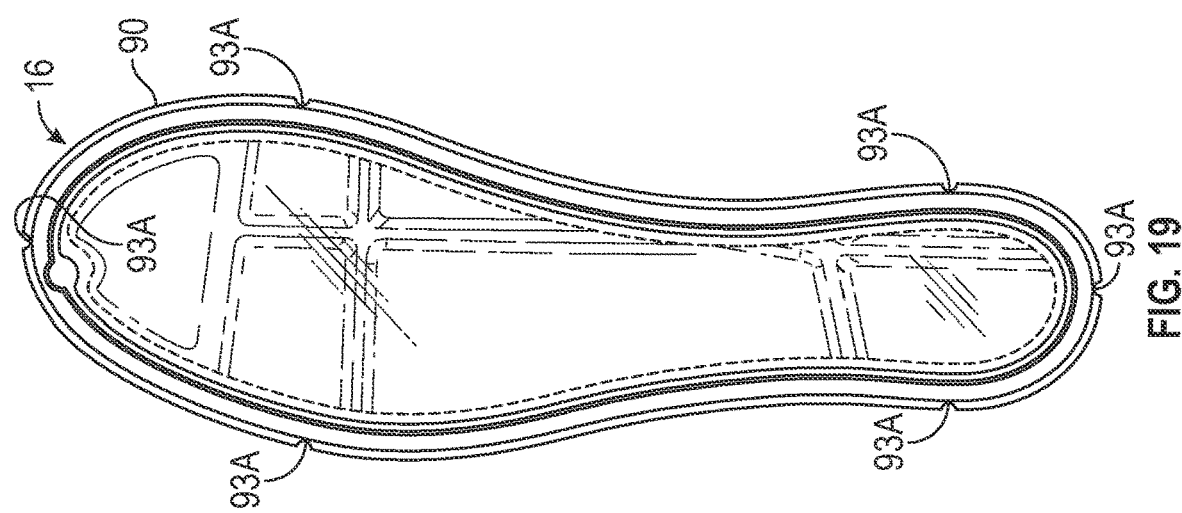
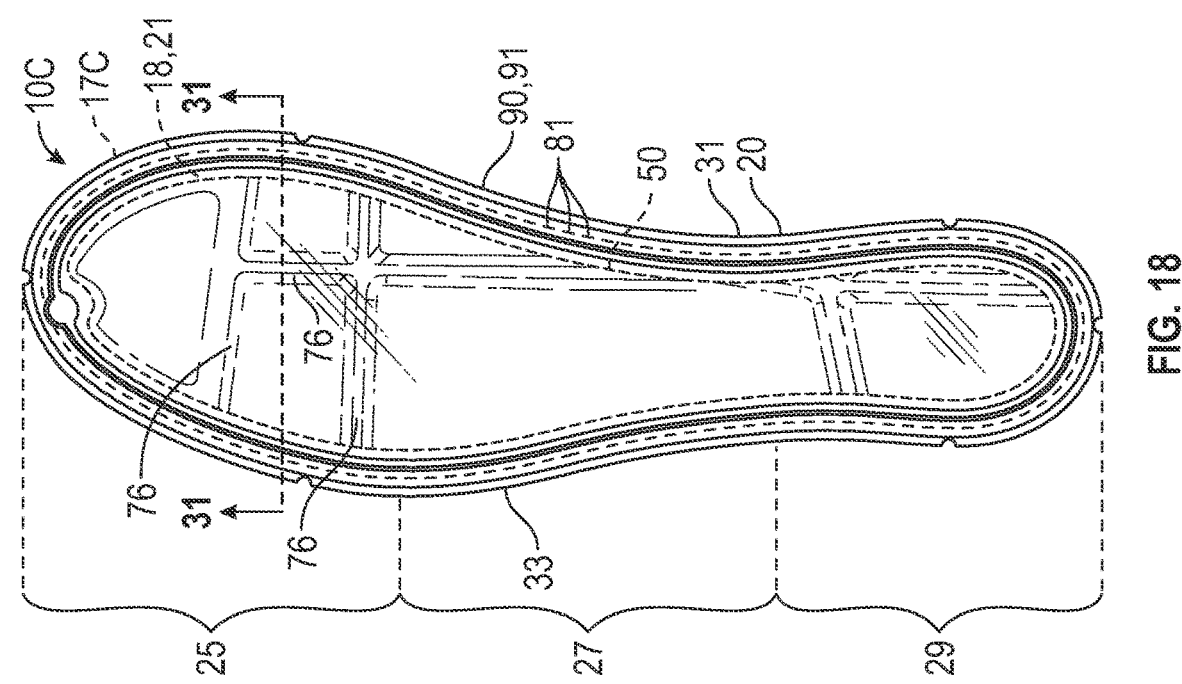

FOOTWEAR STROBEL WITH BLADDER AND LASTING COMPONENT AND METHOD OF MANUFACTURING

CROSS-REFERENCE TO RELATED APPLICATIONS

This application is a divisional of U.S. patent application Ser. No. 16/427,998 filed May 31, 2019, which claims the benefit of priority to U.S. Provisional Application No. 62/678,458, filed May 31, 2018 and both of which are incorporated by reference in their entirety.

TECHNICAL FIELD

The present teachings generally include a strobel for an article of footwear and a method of manufacturing the strobel or the article of footwear.

BACKGROUND

Articles of footwear generally include two primary elements: an upper and a sole structure. The sole structure is configured to be located under a wearer's foot to space the foot away from the ground. One method of manufacturing an article of footwear involves the use of a lasting process. The upper is tightened around the last, thereby imparting the general shape of the foot to the void within the upper.

BRIEF DESCRIPTION OF THE DRAWINGS

FIG. 3 is a schematic illustration in cross-sectional view of the polymeric bladder of FIG. 1 taken at lines 3-3 in FIG. 2, showing a tensile component within the polymeric bladder.

FIG. 4 is a schematic illustration in close-up cross-sectional view of a portion of the polymeric bladder of FIG. 3.

FIG. 5 is a schematic illustration in close-up view of a portion of a polymeric bladder with a flange having grooves on both sides.

FIG. 8 is a schematic illustration in bottom view of a strobel including the polymeric bladder of FIG. 1 and a lasting component stitched to a peripheral flange of the polymeric bladder.

FIG. 9 is schematic illustration in bottom view of the polymeric bladder of FIG. 8.

FIG. 10 is a schematic illustration in bottom view of the lasting component of FIG. 8.

FIG. 11 is a schematic illustration in fragmentary view of a portion of the polymeric bladder of FIG. 9 with an alternative locating feature.

FIG. 18 is a schematic illustration in bottom view of a strobel including a polymeric bladder and a lasting component stitched to the polymeric bladder.

FIG. 19 is a schematic illustration in bottom view of the polymeric bladder of FIG. 18.

FIG. 20 is a schematic illustration in bottom view of the lasting component of FIG. 18.

DESCRIPTION

Figure 1:
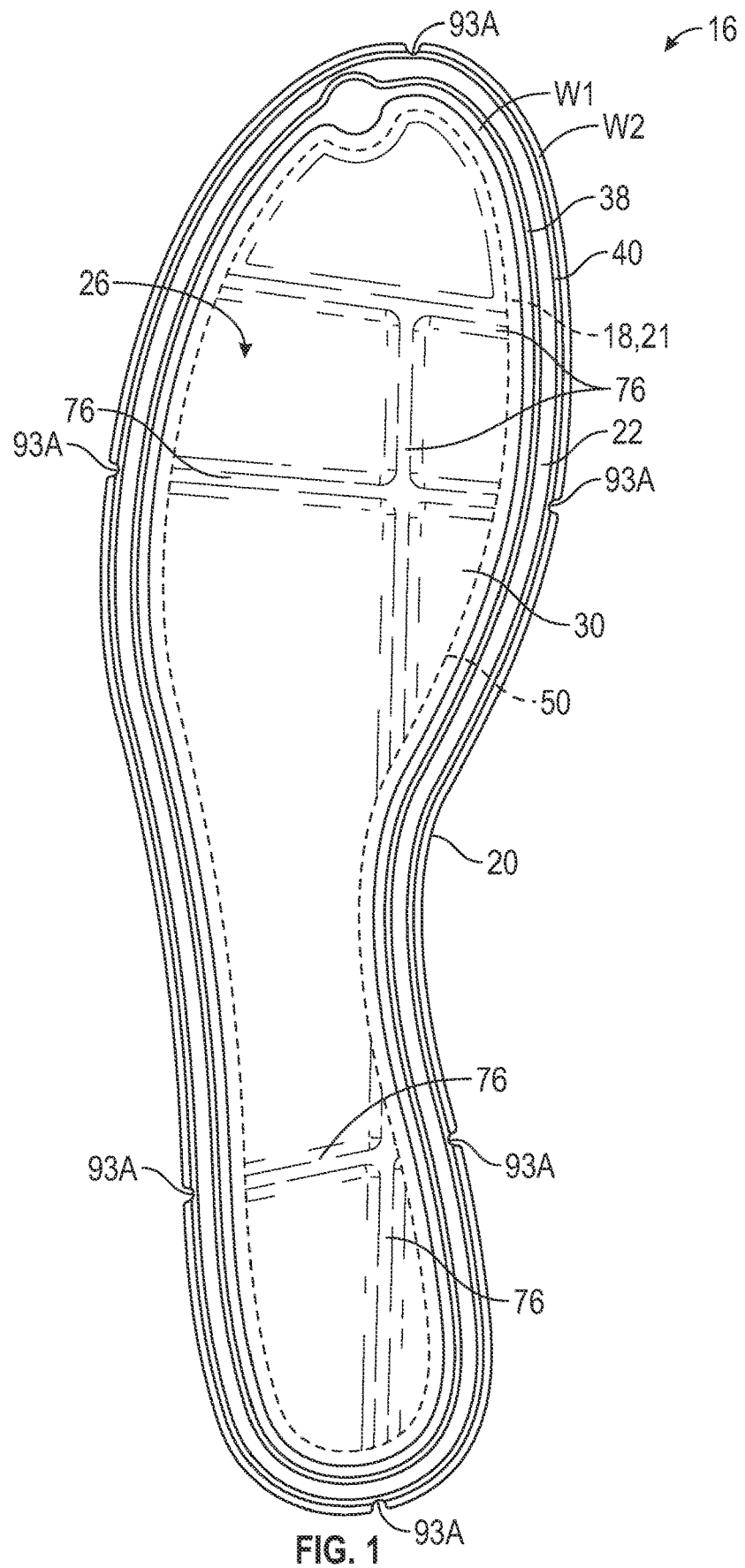
FIG. 1 is a schematic illustration in bottom view of a polymeric bladder for a strobel.

Some footwear includes a strobel secured to a lower perimeter of the upper. Traditionally, a strobel is a relatively inelastic textile material. A strobel disclosed herein includes a polymeric bladder with a sealed, fluid-filled chamber, and may provide greater comfort, resiliency, and energy return than a strobel of a traditional material and configuration. A strobel configured as a polymeric bladder may be a polymeric material that may feel somewhat slippery and/or may be less flexible than traditional strobel material, making it more difficult to grip during manufacturing processes. Accordingly, it may be difficult to accurately stitch the strobel to the upper in a sufficiently short period of time that may be desired during mass production.

The strobel, the article of footwear, and a method of manufacturing footwear as disclosed and as configured herein solves these problems while providing the benefits of a strobel with a fluid-filled bladder. More particularly, an article of footwear comprises a strobel that includes a polymeric bladder defining an interior cavity and configured to retain a fluid in the interior cavity. The polymeric bladder may have a peripheral flange extending around at least a portion of a perimeter of the interior cavity. The strobel may also include a tensile component disposed in the interior cavity and secured to opposing inner surfaces of the polymeric bladder. The peripheral flange may define a groove extending along the peripheral flange. A lasting component may be configured to extend along the peripheral flange around the at least a portion of the perimeter of the interior cavity. The lasting component may be secured to the peripheral flange. The groove may serve as a guide path for an operator or for a machine, including a robotic machine, to follow when stitching or otherwise securing the lasting component to the polymeric bladder.

In one or more embodiments, the lasting component may be secured to the peripheral flange at the groove by a series of stitches extending through the lasting component and through the peripheral flange in the groove.

In one or more embodiments, the lasting component may have an aperture, and the polymeric bladder may extend partially through the aperture. The peripheral flange may abut the lasting component around the aperture. In a non-limiting example, the lasting component has a forefoot region, a heel region, and a midfoot region between the forefoot region and the heel region, and the aperture and the polymeric bladder extend only in one of the forefoot region and the heel region or only in two contiguous ones of the forefoot region, the midfoot region, and the heel region. In another non-limiting example, the lasting component has a forefoot region, a heel region, and a midfoot region between the forefoot region and the heel region, and the aperture and the polymeric bladder extend in each of the forefoot region, the midfoot region, and the heel region.

In one or more embodiments, the lasting component may extend across the polymeric bladder between a medial side of the polymeric bladder and a lateral side of the polymeric bladder. For example, the lasting component may overlay the polymeric bladder from the lateral side to the medial side In one or more embodiments, the peripheral flange may have a first weld and a second weld spaced apart from the first weld. The first weld and the second weld may extend lengthwise along the peripheral flange. The groove may extend lengthwise along the peripheral flange between the first weld and the second weld. The first weld may be inward of the groove. The second weld may be outward of the groove.

In some embodiments, the groove is on a foot-facing side of the polymeric bladder, in other embodiments the groove is on a ground-facing side of the polymeric bladder, and in still other embodiments, both the foot-facing side and the ground-facing side have such a groove. This helps enable use of the polymeric bladder for an article of footwear configured for a right foot, and also, alternatively, for an article of footwear configured for a left foot. Stated differently, the polymeric bladder may be secured to a lasting component for a right foot article of footwear or may be flipped over for securement to a lasting component for a left foot article of footwear. In either case, one of the two grooves will be in the same position relative to the lasting component in both instances to serve as a guide for stitching.

By way of non-limiting example, the peripheral flange may include a first ridge protruding at an outer surface of the peripheral flange between the first weld and the groove, and a second ridge protruding at the outer surface of the peripheral flange between the second weld and the groove. The ridges may be due to material of the polymeric bladder displaced by the first and second welds. The ridges help to define the sides of the groove.

Additionally, the strobel may be configured with a locating feature, such as at least one of a notch in or a protrusion at an outer edge of the peripheral flange or an outer edge of the lasting component, an aperture in the polymeric bladder, a weld pattern of the polymeric bladder, or a marking on the polymeric bladder such as a printed marking. The locating feature may be used for accurate alignment with an upper and/or a footwear last, as described herein.

In one or more embodiments, the polymeric bladder of the strobel may include a first polymeric sheet and a second polymeric sheet. The first polymeric sheet may be bonded to the second polymeric sheet at the peripheral flange. The tensile component may include a first tensile layer, a second tensile layer, and a plurality of tethers spanning the interior cavity from the first tensile layer to the second tensile layer and connecting the first tensile layer to the second tensile layer. The first polymeric sheet may be joined to the first tensile layer at a plurality of inwardly-protruding bonds that protrude inward from the first polymeric sheet only partially across the plurality of tethers toward the second polymeric sheet, and the polymeric bladder is narrowed at the inwardly-protruding bonds. For example, the bonds may be formed by a welding process, such as radio frequency or ultrasonic welding using tooling that results in welds by thermal bonding of the polymeric bladder. Other embodiments may not include any of the inwardly-protruding bonds.

In one or more embodiments, each of the inwardly-protruding bonds extends generally straight along an outer surface of the first polymeric sheet, and the inwardly-protruding bonds are arranged parallel or orthogonal relative to one another at the outer surface of the first polymeric sheet. This arrangement of the inwardly-protruding bonds may encourage flexibility of the strobel at the inwardly-protruding bonds.

In one or more embodiments, the lasting component may be one of a woven or non-woven textile, an elastomer or foam backed with a textile layer.

Within the scope of the present disclosure, the article of footwear may further comprise an upper. The lasting component may also be secured the upper.

In one or more embodiments, the polymeric bladder and the lasting component are each disposed in at least one different one of a forefoot region, a midfoot region, and a heel region of the article of footwear, the lasting component is secured to the polymeric bladder by a first series of stitches extending transversely across the polymeric bladder and the lasting component, and the lasting component and the polymeric bladder are secured to the upper by a second series of stitches extending through the lasting component and through the polymeric bladder in the groove of the polymeric bladder.

In one or more embodiments, the lasting component is secured to the peripheral flange at the groove by a series of stitches extending through the lasting component and through the peripheral flange in the groove.

In one or more embodiments, the series of stitches is a first series of stitches, and the lasting component is secured to the upper at a second series of stitches that extends through the lasting component and the upper. The second series of stitches may extend only through the upper and the lasting component. Alternatively, the second series of stitches may further extend through the peripheral flange in the groove.

In one or more embodiments, a midsole is secured to at least one of the upper, the lasting component, or the polymeric bladder. For example, after a last is placed in the upper that is stitched to the strobel, a midsole can be secured to at least one of the upper or the polymeric bladder, such as to a lower perimeter of the upper and a distal surface of the polymeric bladder. In some embodiments, the article of footwear may include a protective cover layer overlying a proximal surface of the polymeric bladder and secured to the polymeric bladder at the peripheral flange. The protective cover layer may protect the polymeric bladder from shear forces and/or from sharp objects.

A method of manufacturing footwear comprises forming a strobel by securing a lasting component to a peripheral flange of a polymeric bladder. The polymeric bladder defines an interior cavity and is configured to retain a fluid in the interior cavity. The peripheral flange extends around at least a portion of a perimeter of the interior cavity. A tensile component may be disposed in the interior cavity and may be secured to opposing inner surfaces of the polymeric bladder. The polymeric bladder may have a groove that extends along the peripheral flange. The lasting component may be configured to extend along the peripheral flange around the at least a portion of the perimeter of the interior cavity.

In one or more embodiments, securing the lasting component to the peripheral flange at the groove is by stitching the lasting component to the peripheral flange by a series of stitches extending through the lasting component and through the peripheral flange in the groove.

In one or more embodiments, the method includes, prior to securing the lasting component to the peripheral flange, placing the polymeric bladder at an aperture in the lasting component so that the polymeric bladder extends partially through the aperture and the peripheral flange abuts the lasting component around the aperture. The method may also include, prior to placing the polymeric bladder at the aperture in the lasting component, cutting the aperture in the lasting component.

In one or more embodiments, the method may include forming the polymeric bladder with the tensile component in the interior cavity by: placing the tensile component on a first polymeric sheet, placing a second polymeric sheet on the tensile component, and welding the first and second polymeric sheets to one another to define the peripheral flange and the groove. In a non-limiting example, welding the first and second polymeric sheets to one another may include welding a first weld and a second weld spaced apart from one another and extending lengthwise along the peripheral flange, with the groove extending lengthwise along the peripheral flange between the first weld and the second weld.

In one or more embodiments, the method may include aligning a locating feature of the polymeric bladder with a locating feature of the lasting component prior to securing the lasting component to the peripheral flange of the polymeric bladder. The locating feature of the polymeric bladder may be at least one of a notch in or a protrusion at an outer edge of the peripheral flange, an aperture in the polymeric bladder, a weld pattern of the polymeric bladder such as a pattern of inwardly-protruding bonds, or a marking on the polymeric bladder, such as a printed alignment pattern.

In one or more embodiments, securing the lasting component to the peripheral flange of the polymeric bladder occurs with the polymeric bladder in an uninflated state.

In one or more embodiments, the method may comprise securing the lasting component to an upper. The lasting component and the polymeric bladder together form the strobel that extends from a lateral side to a medial side of the upper.

In one or more embodiments, securing the lasting component to the upper is by stitching a perimeter of the lasting component to the upper with a series of stitches extending through the lasting component and the upper. In a non-limiting example, the series of stitches further extends through the peripheral flange in the groove.

In one or more embodiments, the method further comprises securing the lasting component to the peripheral flange by a separate series of stitches prior to securing the lasting component to the upper.

In one or more embodiments, the polymeric bladder is in an uninflated state when the lasting component is stitched to the upper, and the method further comprises inflating the polymeric bladder after the lasting component is stitched to the upper, and sealing the interior cavity after inflating the interior cavity. In other embodiments, the strobel may be inflated prior to stitching the strobel to the upper and/or prior to placing the upper with the strobel stitched thereto on the last.

In one or more embodiments, the method may further include, after sealing the interior cavity, inserting a last into the upper.

In one or more embodiments, the method may also include aligning a locating feature on at least one of the lasting component or the polymeric bladder with a locating feature on the last.

In one or more embodiments, the method may include securing a midsole to at least one of the upper, the lasting component, or the polymeric bladder while the upper, the lasting component, and polymeric bladder are on the last. In a non-limiting example, securing the midsole to at least one of the upper, the lasting component, or the polymeric bladder is by one or more of stitching, thermal bonding, or adhesive bonding.

The above features and advantages and other features and advantages of the present teachings are readily apparent from the following detailed description of the modes for carrying out the present teachings when taken in connection with the accompanying drawings.

Figure 40:
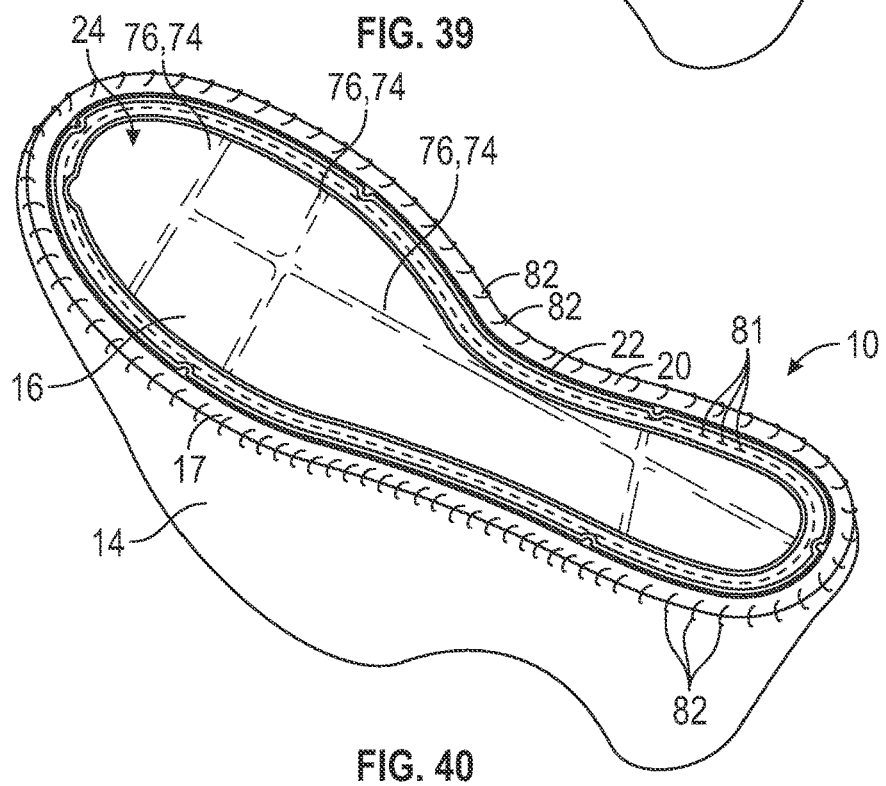
FIG. 40 is a schematic perspective illustration of the strobel and upper of FIG. 39 with the strobel stitched to the upper, and the strobel in an uninflated state.

Referring to the drawings, wherein like reference numbers refer to like components throughout the views, FIGS. 1-4 show a polymeric bladder 16 included in a strobel 10 shown in FIG. 8 for an article of footwear 12 that includes an upper 14, shown, for example, in FIG. 40. The strobel 10 comprises a polymeric bladder 16 and a lasting component 17 shown in FIGS. 8 and 10. The polymeric bladder 16 defines an interior cavity 18 (shown in FIG. 3) and is configured to retain a fluid in the interior cavity. The polymeric bladder 16 has a peripheral flange 20 extending around at least a portion of a perimeter 21 of the interior cavity 18. In the embodiment shown, the peripheral flange 20 extends around the entire perimeter 21 (e.g., outwardly surrounding the interior cavity 18) generally in an X-Y plane of the polymeric bladder 16, where the Z plane is the height of the polymeric bladder 16 from a proximal surface 24 of the polymeric bladder 16 to a distal surface 26 of the polymeric bladder 16, shown in FIG. 3. The peripheral flange 20 extends around the forefoot region 25, the midfoot region 27, and the heel region 29 of the polymeric bladder 16, shown in FIG. 2.

Figure 27:
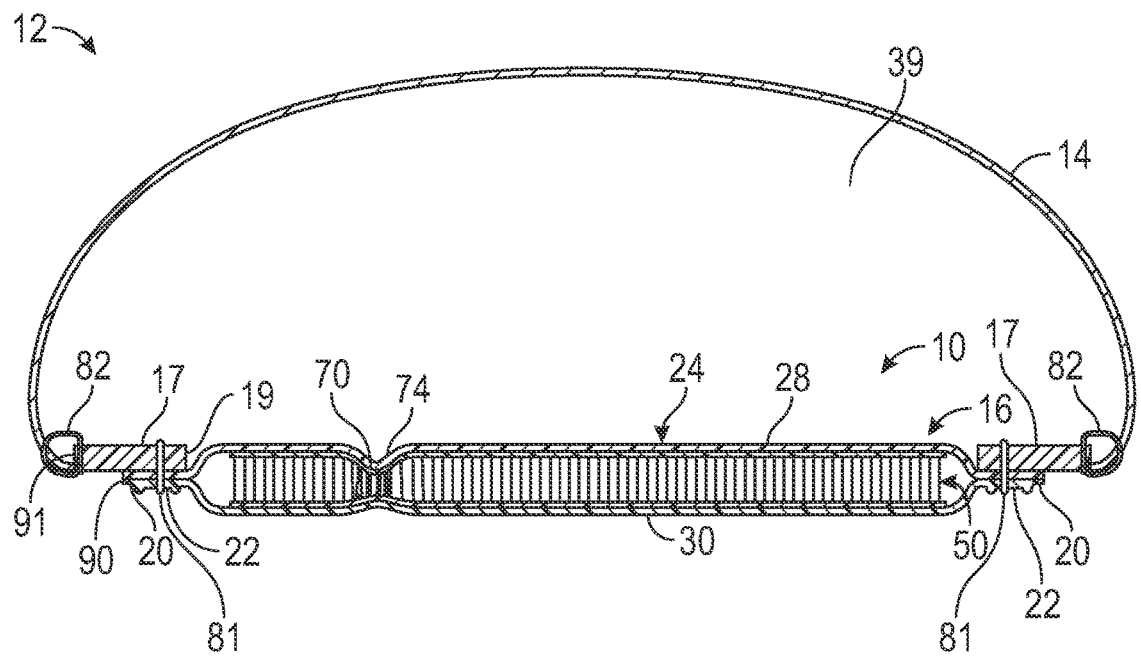
FIG. 27 is a cross-sectional view of the strobel of FIG. 8 taken at lines 27-27 in FIG. 8, inverted relative to FIG. 8 and secured to a footwear upper.

The peripheral flange 20 defines a groove 22 extending along the peripheral flange 20. As further discussed herein, the groove 22 serves as a guide path for an operator or for a machine, including a robotic machine, to follow when stitching or otherwise securing the polymeric bladder 16 to the lasting component 17. In some of the embodiments shown and described herein, the strobel 10 is secured to the upper 14 by stitching that extends through the peripheral flange 20 (see, e.g., FIGS. 27-34). When the strobel 10 is secured to the upper 14, the strobel 10 and the upper 14 together define a foot-receiving cavity 39 as shown in FIG. 27. Dynamic compressive loading of the sole structure 80 by a foot in the foot-receiving cavity 39 as represented by forces FC may cause tension in the strobel 10 around the peripheral flange 20 in an outward direction as represented by outward forces FO in FIG. 33, creating a trampoline like effect as the tension is subsequently relieved and the tethers 60 described herein return to their tensioned state.

The polymeric bladder 16 includes a first polymeric sheet 28 and a second polymeric sheet 30. The first polymeric sheet 28 is secured to the second polymeric sheet 30 at the peripheral flange 20 to enclose the interior cavity 18. Stated differently, when the sheets 28, 30 are secured together at the peripheral flange 20 and the polymeric bladder 16 is sealed, the first polymeric sheet 28 and the second polymeric sheet 30 retain a fluid in the interior cavity 18. As used herein, a "fluid" filling the interior cavity 18 may be a gas, such as air, nitrogen, another gas, or a combination thereof.

The first and second polymeric sheets 28, 30 can be a variety of polymeric materials that can resiliently retain a fluid such as nitrogen, air, or another gas. Examples of polymeric materials for the first and second polymeric sheets 28, 30 include thermoplastic urethane, polyurethane, polyester, polyester polyurethane, and polyether polyurethane. Moreover, the first and second polymeric sheets 28, 30 can each be formed of layers of different materials including polymeric materials. In one embodiment, each of the first and second polymeric sheets 28, 30 is formed from thin films having one or more thermoplastic polyurethane layers with one or more barrier layers of a copolymer of ethylene and vinyl alcohol (EVOH) that is impermeable to the pressurized fluid contained therein such as a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Additional suitable materials for the first and second polymeric sheets 28, 30 are disclosed in U.S. Pat. Nos. 4,183,156 and 4,219,945 to Rudy which are incorporated by reference in their entireties. Further suitable materials for the first and second polymeric sheets 28, 30 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the strobel 10, engineering properties such as tensile strength, stretch properties, fatigue characteristics, dynamic modulus, and loss tangent can be considered. For example, the thicknesses of the first and second polymeric sheets 28, 30 used to form the strobel 10 can be selected to provide these characteristics.

With reference to FIG. 4, the peripheral flange 20 has a first weld W1 and a second weld W2 spaced apart from the first weld W1. The first weld W1 and the second weld W2 cause the first and second polymeric sheets 28, 30 to bond to one another at an interface 32 at the welds W1, W2. The welds W1 and W2 may be formed by using a tooling assembly (also referred to as a mold assembly) similar to that of FIGS. 36-38 that includes a first and a second mold portion 34A, 34B and a mold insert 34C, as shown and described in FIG. 36. The mold portions 34A, 34B are closed together on the polymeric sheets 28, 30, with the tensile component 50 between the polymeric sheets 28, 30. The polymeric sheets 28, 30 and tensile component 50 are then welded by radio frequency welding (also referred to as high frequency or dielectric welding) or are secured by another manner of thermal or adhesive bonding, as a power source 36 supplies energy creating an alternating electric field that heats the polymeric sheets 28, 30 where the mold portions 34A, 34B or mold insert 34C are applied to the polymeric sheets 28, 30. In the mold assembly of FIGS. 36-38, the welds W1, W2 are on the same side of the bladder 16 as are the inwardly-protruding bonds 70. In the bladder 16 shown in FIG. 3, the welds W1, W2 are on an opposite side of the bladder 16 from the inwardly-protruding bonds 70. This may be accomplished by securing the mold insert 34C to the mold portions 34A, for example. In an embodiment with welds W1, W2 on both sides of the peripheral flange 20, both mold portions 34A, 34B would include ridges 94, 96.

The first weld W1 and the second weld W2 extend lengthwise along the peripheral flange 20. As best shown in FIG. 1, the first weld W1 and the second weld W2 extend along the entire peripheral flange 20 and in some embodiments completely surround (i.e., encircle) the interior cavity 18. The groove 22 extends lengthwise along the peripheral flange 20 between the first weld W1 and the second weld W2. The first weld W1 is inward of the groove 22. The second weld W2 is outward of the groove 22. Stated differently, the first weld W1 is inward of the groove 22 and the second weld W2 is outward of the groove 22 where inward is toward the center of the polymeric bladder 16 and outward is away from the center of the polymeric bladder 16.

Heating and pressure of the tooling assembly at the welds W1 and W2 may displace some of the material of the second polymeric sheet 30 so that the peripheral flange 20 may include a first ridge 38 protruding at an outer surface, e.g., the distal surface 26 of the peripheral flange 20 between the first weld W1 and the groove 22, and a second ridge 40 protruding at the distal surface 26 of the peripheral flange 20 between the second weld W2 and the groove 22. The ridges 38, 40 help to define the sides of the groove 22.

In some embodiments, the groove 22 is in the distal surface 26, which is the ground-facing side of the polymeric bladder 16 when the strobel 10 is secured to the upper 14. In other embodiments, the groove 22 may be on the proximal side (proximal surface 24), which is the foot-facing side of the polymeric bladder 16 when the strobel 10 is secured to the upper 14. Because the polymeric sheets 28, 30 may be transparent, the groove 22 would be visible through the peripheral flange 20 at the distal side in embodiments in which a groove 22 is provided only on the proximal side. In still other embodiments, both the distal surface 26 and the proximal surface 24 have such a groove 22, as shown on the flange 20 in FIG. 5. The peripheral flange 20 defines an additional groove 22 extending along the proximal surface 24 of the peripheral flange 20. The peripheral flange 20 has an additional first weld W1 and an additional second weld W2 spaced apart from the additional first weld W1 on the proximal surface 24 of the peripheral flange 20. The additional first weld W1 and the additional second weld W2 extend lengthwise along the peripheral flange 20, and the additional groove 22 extends lengthwise along the peripheral flange 20 between the additional first weld W1 and the additional second weld W2. The additional first weld W1 is inward of the additional groove 22, and the additional second weld W2 is outward of the additional groove 22. Heating and pressure of the tooling assembly at the additional welds W1 and W2 may displace some of the material of the first polymeric sheet 28 so that the peripheral flange 20 may include a first ridge 38 protruding at the proximal surface 24 of the peripheral flange 20 between the additional first weld W1 and the additional groove 22, and a second ridge 40 protruding at the proximal surface 24 of the peripheral flange 20 between the additional second weld W2 and the additional groove 22. The ridges 38, 40 help to define the sides of the additional groove 22. Providing both sides of the peripheral flange 20 with a groove 22 helps enable use of the polymeric bladder 16 for an article of footwear configured for a right foot, and also, alternatively, for an article of footwear configured for a left foot. Stated differently, a strobel may be secured to an upper for a right foot article of footwear or may be flipped over for securement to an upper for a left foot article of footwear. In either case, one of the two grooves 22 will be in the same position relative to the upper in both instances (e.g., disposed outward (away from the upper)) to serve as a guide for stitching. In embodiments having a groove 22 on only one of the sides of the peripheral flange 20, because the polymeric sheets 28, 30 may be transparent, the groove 22 would be visible at the distal side even in embodiments in which a groove 22 is provided only on the proximal side and vice versa.

As best shown in FIG. 3, a tensile component 50 is disposed in the interior cavity 18. The tensile component 50 is secured to opposing inner surfaces 52, 54 of the polymeric bladder 16. The tensile component 50 includes a first tensile layer 56, a second tensile layer 58, and a plurality of tethers 60 spanning the interior cavity 18 from the first tensile layer 56 to the second tensile layer 58. The tethers 60 connect the first tensile layer 56 to the second tensile layer 58. Only some of the tethers 60 are indicated with reference numbers in FIG. 3. The tethers 60 may also be referred to as fabric tensile members or threads and may be in the form of drop threads that connect the first tensile layer 56 and the second tensile layer 58. The tensile component 50 may be formed as a unitary, one-piece textile element having a spacer-knit textile.

The first tensile layer 56 is bonded to the inner surface 52 of the first polymeric sheet 28, and the second tensile layer 58 is bonded to the inner surface 54 of the second polymeric sheet 30. More specifically, a first surface bond 62 joins the inner surface 52 of the first polymeric sheet 28 to the outer surface 64 of the first tensile layer 56. A second surface bond 66 joins the inner surface 54 of the second polymeric sheet 30 to the outer surface 68 of the second tensile layer 58, opposite the first tensile layer 56. Entire interfacing portions of the surfaces 52, 64 and of the surfaces 54, 68 are bonded to one another.

The tethers 60 restrain separation of the first and second polymeric sheets 28, 30 to the maximum separated positions shown in FIG. 3, which depicts the polymeric bladder 16 with the interior cavity 18 inflated and sealed under a given inflation pressure of gas in the interior cavity 18, so that the polymeric bladder 16 is in an inflated state. It should be appreciated, however, that, in some embodiments of a method of manufacturing 200 the strobel 10 described herein, the strobel 10 is not inflated and sealed until after it is secured to the upper 14. In other embodiments of the method 200, the strobel 10 may be inflated and sealed before it is secured to the upper 14. The outward force on the first and second polymeric sheets 28, 30 due to the pressurized gas in the interior cavity 18 places the tethers 60 in tension, and the tethers 60 prevent the tensile layers 56, 58 and polymeric sheets 28, 30 from further outward movement away from one another. However, the tethers 60 do not present resistance to compression when under a compressive load. When pressure is exerted on the polymeric bladder 16 such as due to compressive forces FC of a dynamic load of a wearer when the footwear 12 impacts the ground during running or other movements, as shown in FIG. 27, the polymeric bladder 16 is compressed, and the polymeric sheets 28, 30 move closer together as the tethers 60 collapse (e.g., go slack) in proportion to the load on the first and second polymeric sheets 28, 30 adjacent the particular tethers 60.

Figure 36:
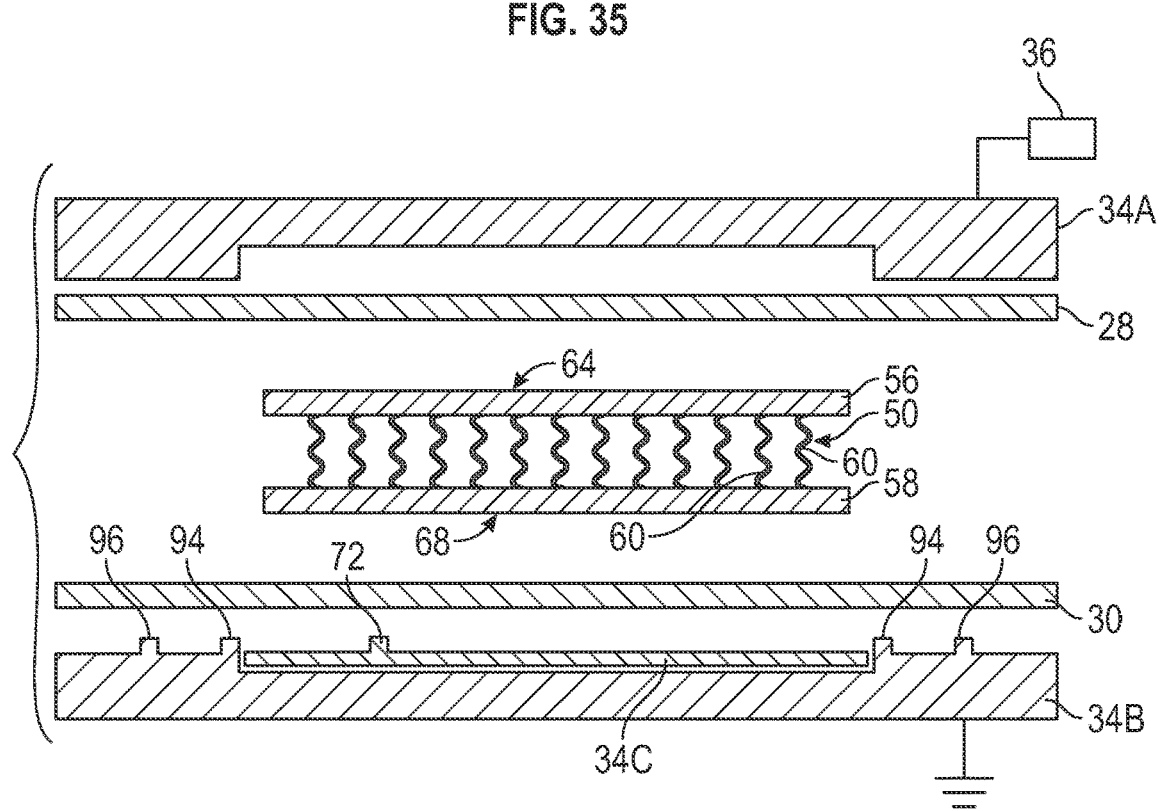
FIG. 36 is a schematic illustration in exploded view of the polymeric bladder of FIG. 1 and a tooling assembly.
Figure 37:
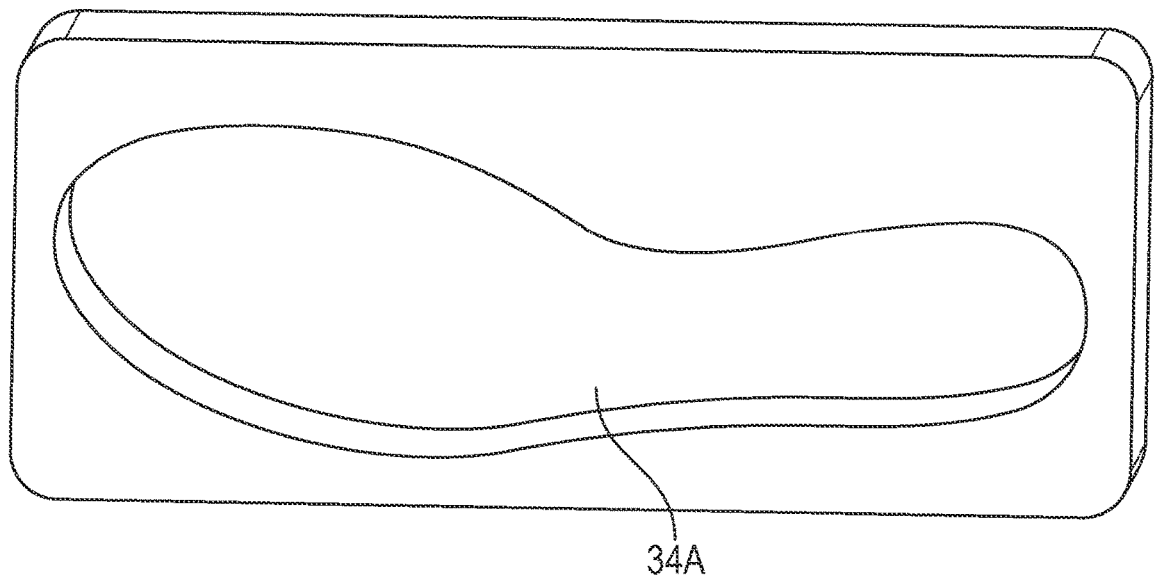
FIG. 37 is a schematic perspective illustration of a portion of the tooling assembly of FIG. 36.

As shown in FIG. 36, prior to bonding the tensile component 50 to the first and second polymeric sheets 28, 30, the tethers 60 of the tensile component 50 may all be initial lengths, and in some embodiments all substantially the same length, and the first and second tensile layers 56, 58 connected by the tethers 60 may have generally flat outer surfaces 64, 68, respectively, directly above the tethers 60. In FIG. 36, the tethers 60 are represented in a slackened state as the tensile component 50 is not within a sealed interior cavity and is not subjected to tension as it is when the polymeric bladder 16 of the strobel 10 is in an inflated state and not under a dynamic compressive load.

Figure 2:
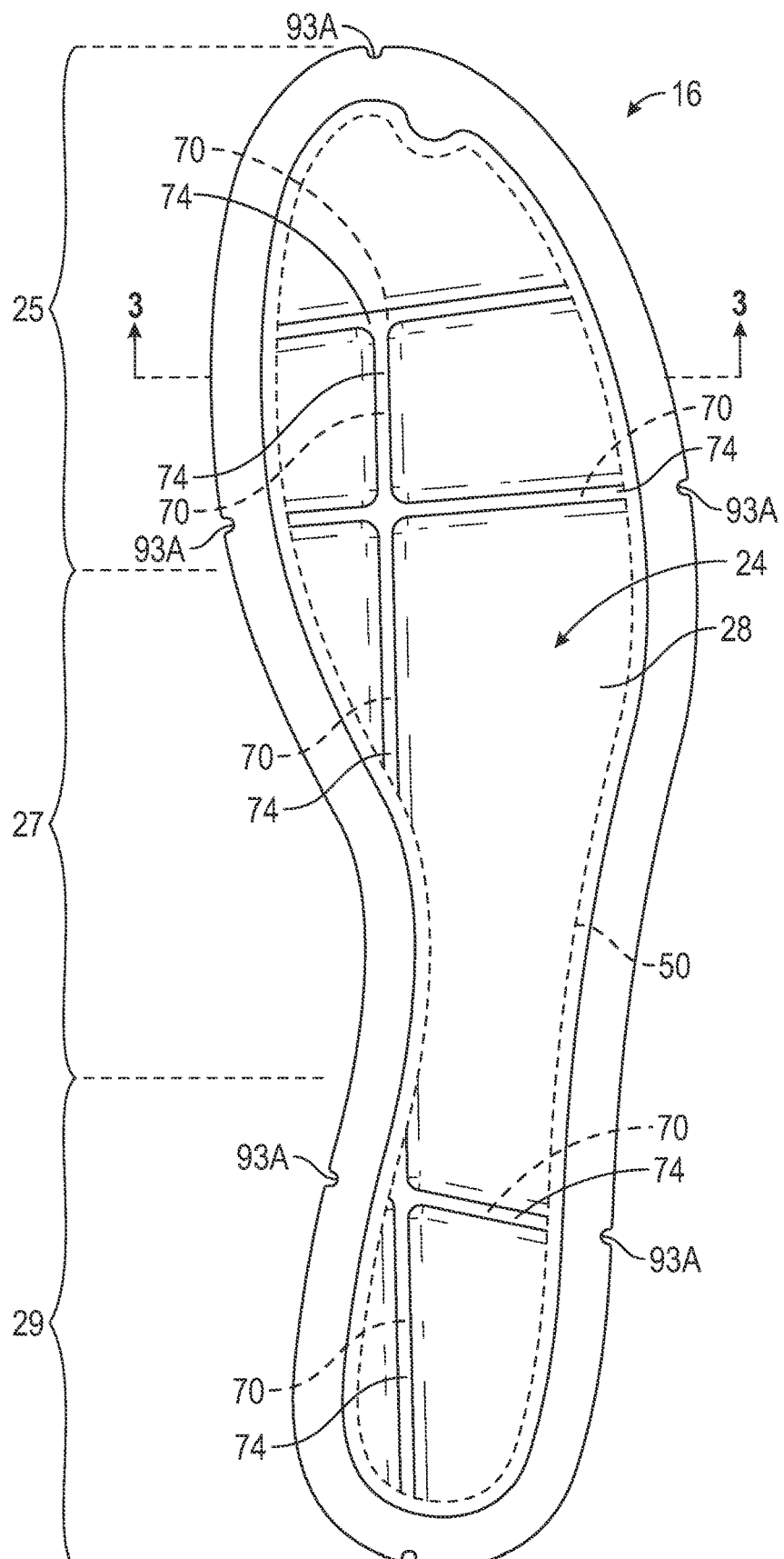
FIG. 2 is a schematic illustration in top view of the polymeric bladder of FIG. 1.
Figure 38:
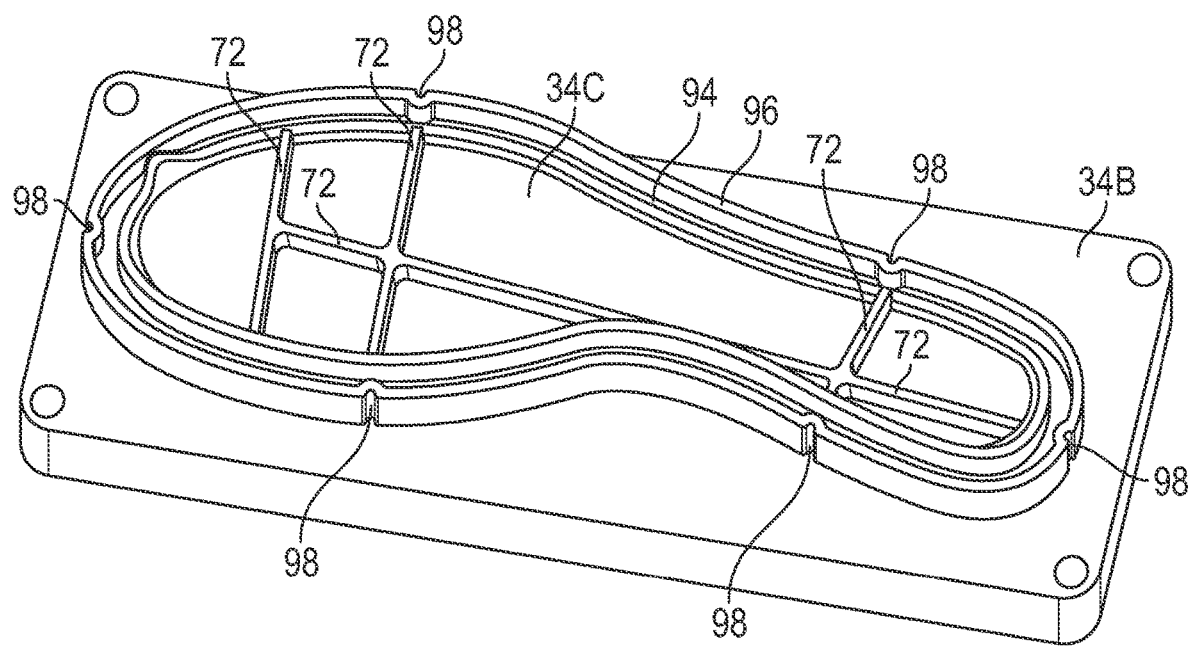
FIG. 38 is a schematic perspective illustration of another portion of the tooling assembly of FIG. 36.

Under the method 200 provided herein, although the tethers 60 are originally of the same length and the outer surfaces 64, 68 of the first and second tensile layers 56, 58 and the surfaces 24, 26 of the first and second polymeric sheets 28, 30, respectively, are originally generally flat directly above the tethers (e.g., not contoured) prior to forming the strobel 10, in some embodiments, the method 200 of manufacturing produces an inwardly-protruding bond 70 that joins the first polymeric sheet 28 to the first tensile layer 56 and protrudes inward from the first polymeric sheet 28 toward the second polymeric sheet 30 directly into a region of the interior cavity 18 occupied by some of the tethers 60. In fact, there are multiple inwardly-protruding bonds 70 as shown in FIG. 2. Each inwardly-protruding bond 70 protrudes farther toward the second polymeric sheet 30 than the first surface bond 62. The plurality of inwardly-protruding bonds 70 protrude inward from the first polymeric sheet 28 only partially across the plurality of tethers 60 toward the second polymeric sheet 30, and the polymeric bladder 16 is narrowed at the inwardly-protruding bonds 70. For example, the bonds may be formed by a welding process, such as radio frequency or ultrasonic welding using tooling that results in thermal bonds in the polymeric bladder 16. Each inwardly-protruding bond 70 results from a respective protrusion 72 of a mold component such as mold insert 34C of FIGS. 36 and 38. The protrusions 72 contact the first polymeric sheet 28 during the method 200 of manufacturing disclosed herein. FIG. 38 shows a representative mold insert 34C having the protrusions 72 in a first pattern that result in the bond pattern of inwardly-protruding bonds 70 at the proximal surface 24 of the polymeric bladder shown in FIG. 2, although the mold insert 34C is shown secured to the mold portion 34B for an embodiment in which the welds W1, W2 are on the same side of the bladder 16 as the inwardly-protruding bonds. The mold insert 34C may also be referred to as a shim.

Figure 6:
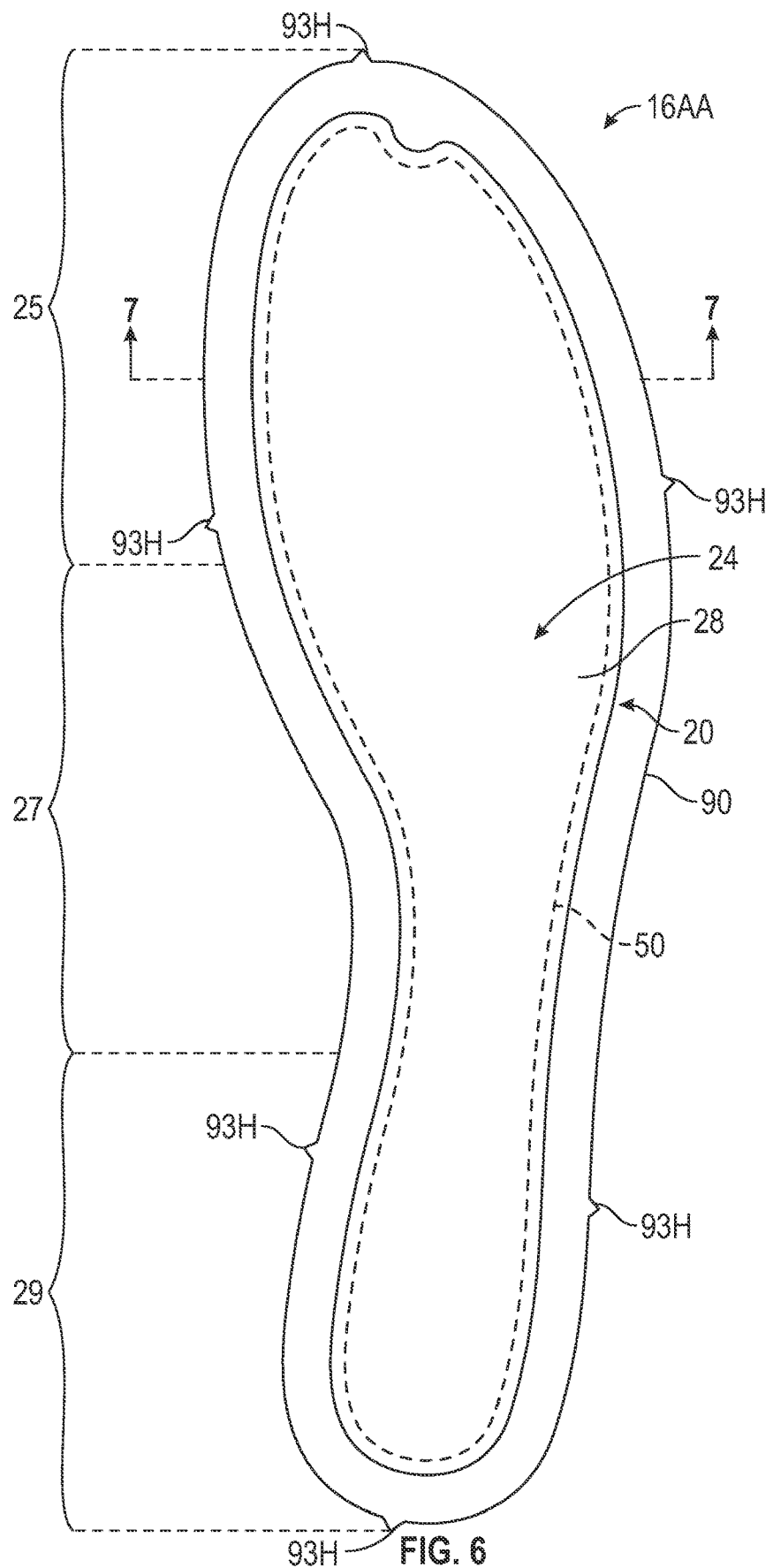
FIG. 6 is a schematic illustration in top view of an alternative embodiment of a strobel for an article of footwear.
Figure 7:
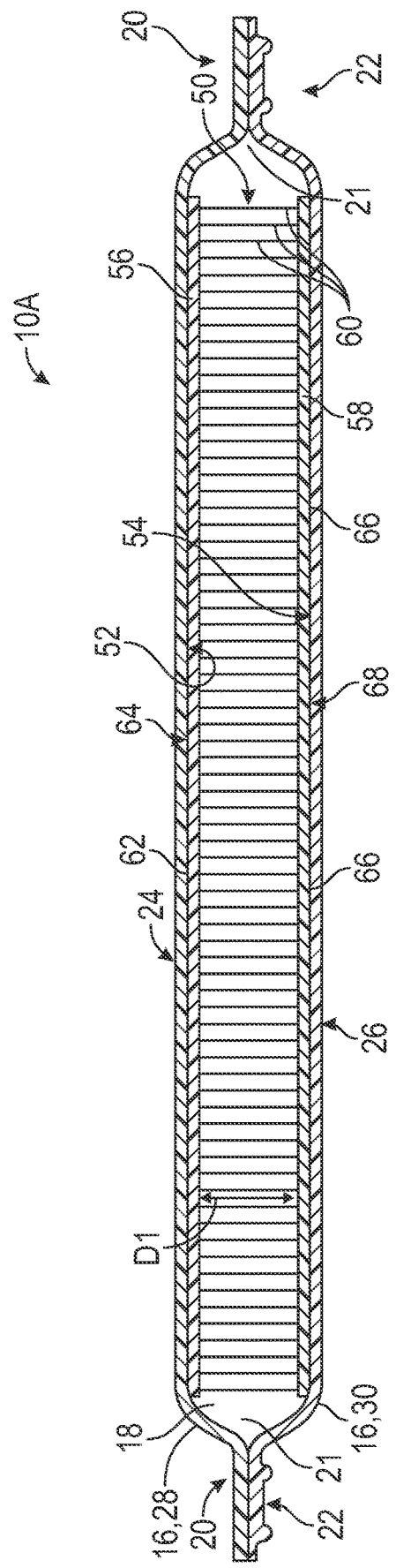
FIG. 7 is a schematic illustration in cross-sectional view of the strobel of FIG. 6 taken at lines 7-7 in FIG. 6.

The inwardly-protruding bonds 70 result in depressed grooves 74 at the proximal surface 24 of the first polymeric sheet 28. In the embodiment shown, the inwardly-protruding bonds 70 are only at the first polymeric sheet 28. In other embodiments, mold inserts such as mold insert 34C may be placed adjacent both the first polymeric sheet 28 and the second polymeric sheet 30 to also provide inwardly-protruding bonds 70 at the second polymeric sheet 30 as an alternative to or in addition to the inwardly-protruding bonds 70 at the first polymeric sheet 28. In still other embodiments, such as the bladder 16AA shown in FIGS. 6 and 7, no inwardly-protruding bonds 70 are formed at either of the first and second polymeric sheets 28, 30.

Each inwardly-protruding bond 70 partially traverses the plurality of tethers 60 as shown in FIG. 3. Stated differently, the inwardly-protruding bonds 70 are directly outward of different ones of the tethers 60 and protrude inward on those tethers 60. The tethers 60 may be arranged in rows, with each row extending transversely between the tensile layers 56, 58, or in any other pattern in which the tethers 60 extend between the tensile layers 56, 58. Various different ones of the tethers 60 are aligned with the inwardly-protruding bonds 70. An inwardly-protruding bond 70 may traverse different rows of the tethers 60 such that different tethers 60 from different rows are aligned with (e.g., under or over) an inwardly-protruding bond 70, or an inwardly-protruding bond 70 may be directly aligned with a single row. Some of the inwardly-protruding bonds 70 could be between rows of tethers.

Because the inwardly-protruding bonds 70 at least partially traverse the plurality of tethers 60, in one or more embodiments and with reference to FIG. 3, the plurality of tethers 60 includes tethers 60A aligned with one of the inwardly-protruding bonds 70 and tethers 60B displaced each of the inwardly-protruding bonds 70. Only some of the tethers 60A, 60B are labelled in FIG. 3. Tethers 60A that are aligned with an inwardly-protruding bond 70 are deformed by heat, by compression of the overlaying of material of the first tensile layer 56, and/or by the overlaying material of the first tensile layer 56 coating the tethers 60A such that the tethers 60A are shorter, thicker, or both shorter and thicker at the inwardly-protruding bonds 70 than elsewhere. Such tethers are indicated with reference numeral 60A in FIG. 3 and may be referred to as modified tethers 60A. However, references to tethers 60 herein include tethers 60A and tethers 60B unless otherwise specified.

When the interior cavity 18 is inflated, the modified tethers 60A result in depressed grooves 74 in the proximal surface 24 of the first polymeric sheet 28 as indicated in FIGS. 2 and 3. When an inflation pressure of the gas in the interior cavity 18 is sufficient to tension the plurality of tethers 60, the inwardly-protruding bonds 70 define grooves 74 at the proximal surface 24 of the first polymeric sheet 28. At each groove 74, the polymeric bladder 16 is divided into what may be referred to as a first article portion 11 on one side of the groove 74 and a second article portion 13 on the other side of the groove 74, as indicated in FIG. 3. The first article portion 11 is articulated relative to the second article portion 13 along the groove 74. Stated differently, the proximal surface 24 of the first polymeric sheet 28 at a first side of the inwardly-protruding bond 70 is non-planar with the proximal surface 24 of the first polymeric sheet 28 at a second side of the inwardly-protruding bond 70, the second side being opposite of the first side.

The tension of the modified tethers 60A also causes recesses 76 in the distal surface 26 of the second polymeric sheet 30. The second polymeric sheet 30 is recessed inward toward a corresponding groove 74 and inwardly-protruding bond 70 at each recess 76 when the interior cavity 18 is inflated.

The physical deformation of the first polymeric sheet 28 and the first tensile layer 56 combined with the tension of the modified tethers 60A will cause the grooves 74 to be deeper than the recesses 76, which result only from the tension of the shortened modified tethers 60A. Accordingly, the polymeric bladder 16 may have an articulated shape, such as when inflated, not assembled with or constrained by other components, and not under loading, causing the polymeric bladder 16 to be slightly concave at the proximal surface 24 and slightly convex at the distal surface 26. The strobel 10 will thus be biased to the articulated shape, as the grooves 74 and recesses 76 together encourage articulation of the polymeric bladder 16 to occur at the grooves 74, as the overall thickness of the polymeric bladder 16 is reduced at the grooves 74, decreasing bending stiffness of the strobel 10 at the grooves 74.

Figure 28:
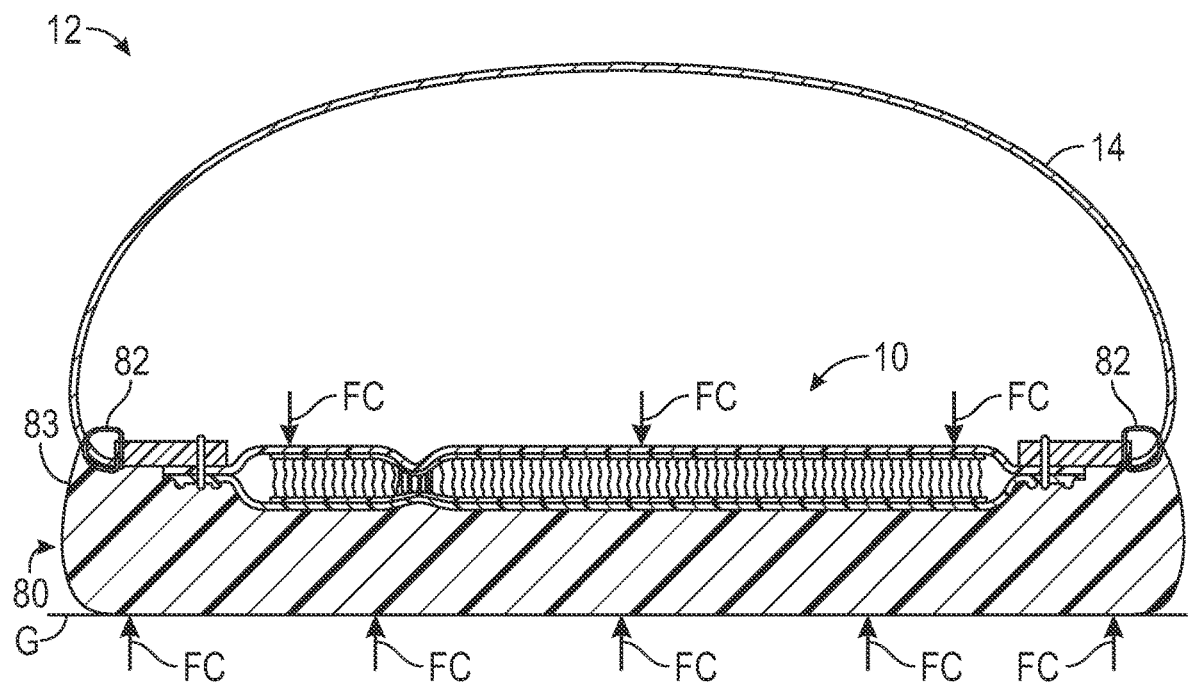
FIG. 28 is a cross-sectional view of an article of footwear including the strobel and upper of FIG. 27 and a midsole under dynamic compressive loading.
Figure 29:
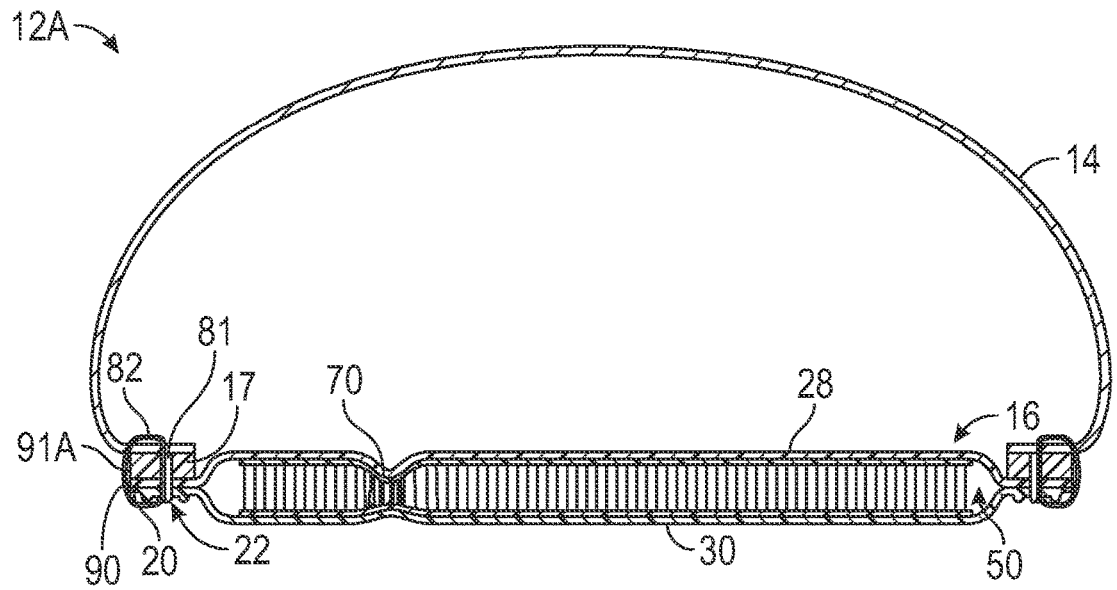
FIG. 29 is a cross-sectional view of a strobel including the polymeric bladder of FIG. 1 stitched to an alternative lasting component and a footwear upper.
Figure 30:
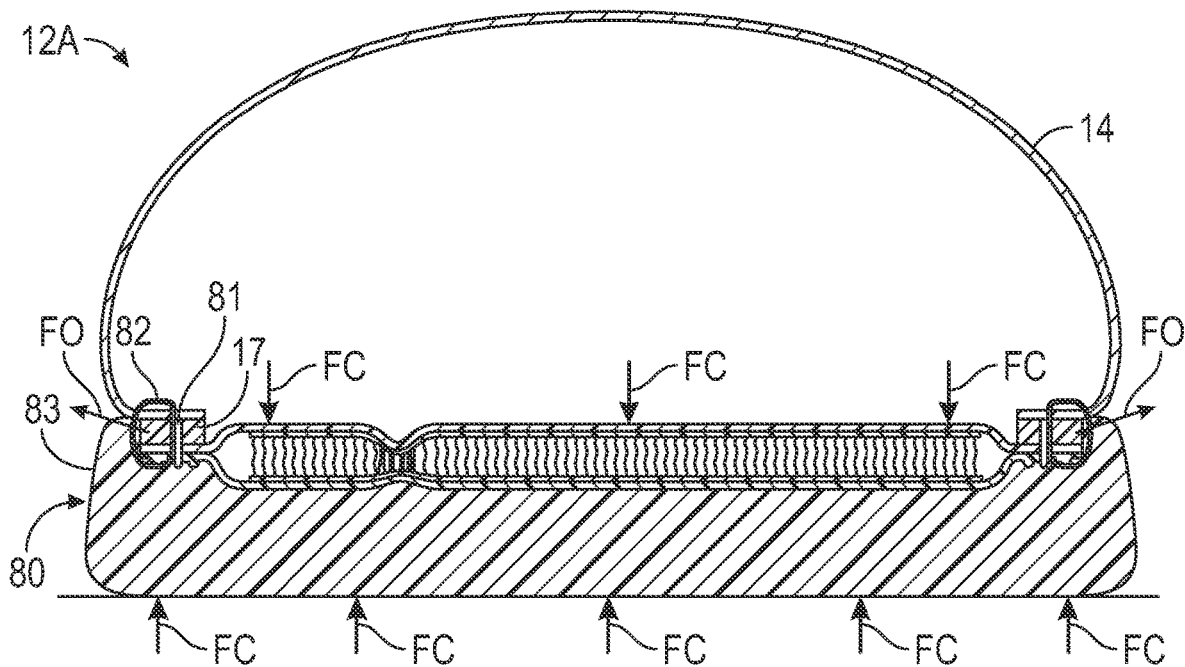
FIG. 30 is a cross-sectional view of an article of footwear including the strobel and upper of FIG. 29 and a midsole under dynamic compressive loading.

The grooves 74 act as flexion axes of the strobel 10 thereby increasing flexibility of the sole structure 80 when the strobel 10 is included in the sole structure 80 of the article of footwear 12 as in FIG. 28. The inwardly-protruding bonds 70 and resulting grooves 74 may establish flexion axes, some of which flexion axes may be aligned with joints of the foot, such as the metatarsal phalangeal joints. The flexion axes created by the inwardly-protruding bonds 70 and grooves 74 run laterally and longitudinally along the proximal surface 24 and may increase transverse (i.e. lateral)

and longitudinal flexibility of the strobel 10. In one or more embodiments, such as is shown in FIG. 2, each of the inwardly-protruding bonds 70 extends generally straight along the proximal surface 24 of the first polymeric sheet 28, and the center axes of the inwardly-protruding bonds 70 are arranged parallel or orthogonal relative to one another at the proximal surface 24 of the first polymeric sheet 28.

Figure 45:
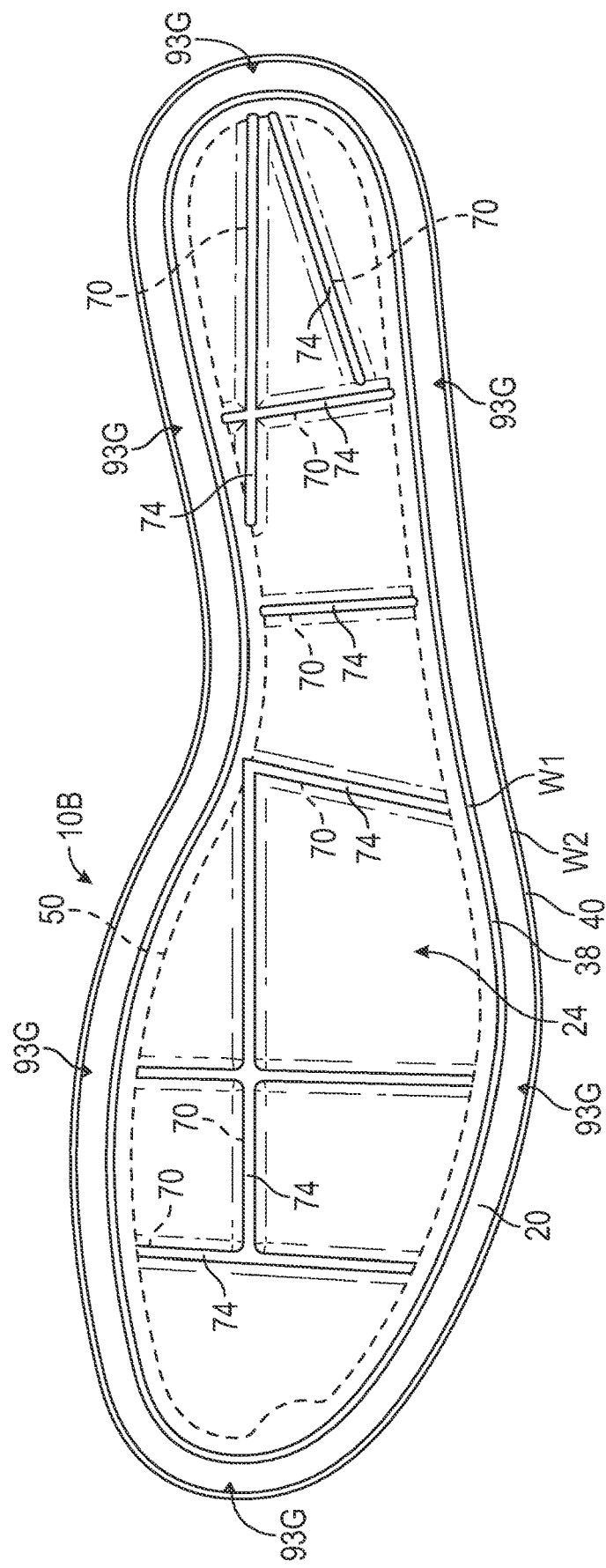
FIG. 45 is a schematic illustration in plan view of an alternative embodiment of a strobel for an article of footwear.

Inwardly-protruding bonds may be arranged in other patterns in other embodiments. For example, providing a mold insert with a different arrangement of protrusions 72 than those shown in FIG. 21 will result in a different pattern of inwardly-protruding bonds 70. One example of an alternative pattern of inwardly-protruding bonds is shown in FIG. 45 as described herein.

Referring to FIG. 3, each inwardly-protruding bond 70 is spaced apart from the second polymeric sheet 30 such that the interior cavity 18 is narrowed but not closed at the inwardly-protruding bond 70, and the gas in the interior cavity 18 can still fluidly communicate across the inwardly-protruding bond 70. The first tensile layer 56 is spaced apart from the second tensile layer 58 by a first distance D1 at the tethers 60B adjacent to the inwardly-protruding bond 70, and the inwardly-protruding bond 70 is spaced apart from the second tensile layer 58 by a second distance D2, which may be the minimum distance between the inwardly-protruding bond 70 and the second tensile layer 58 (i.e., the distance at the most narrowed portion of the interior cavity 18 under the inwardly-protruding bond 70). In an embodiment, the portion 200A of the method 200 of manufacturing may be controlled so that the second distance D2 is between 50 percent and 80 percent of the first distance D1. For example, factors that may influence the inwardly-protruding bond 70 and the extent of its protrusion toward the second polymeric sheet 30 can be controlled to provide this desired ratio of the second distance D2 to the first distance D1. Such factors may include the depth of the protrusion 72 that creates the inwardly-protruding bond 70, the temperature of the mold insert 34C or other mold components, the temperature of the components of the strobel 10, vacuum and/or inflation pressures in the mold cavity during manufacturing, the weld power or weld frequency if radio frequency welding is used, and other factors.

Accordingly, a portion of the interior cavity 18 at a first side of the inwardly-protruding bond 70 is in fluid communication with a portion of the interior cavity 18 at a second side of the inwardly-protruding bond 70, the second side opposite of the first side, as indicated in FIG. 3. The modified tethers 60A shown extending under the inwardly-protruding bond 70 between the two portions are narrow in diameter and allow gas to flow around and between the tethers 60A. This allows the gas to be displaced from the interior cavity 18 at one side of the tethers 60A to the interior cavity 18 at the other side of the tethers 60A when compressive forces FC are applied to the strobel 10, such as during impact of the article of footwear 12 with the ground Gin FIG. 28. For example, as a foot rolls forward from heel to toe during a foot strike, the gas may be displaced from rearward in the strobel 10 to a portion more forward in the strobel 10. Supportive cushioning provided by the fluid in the interior cavity 18 can thus be provided in areas most needed during use of the strobel 10.

Figure 33:
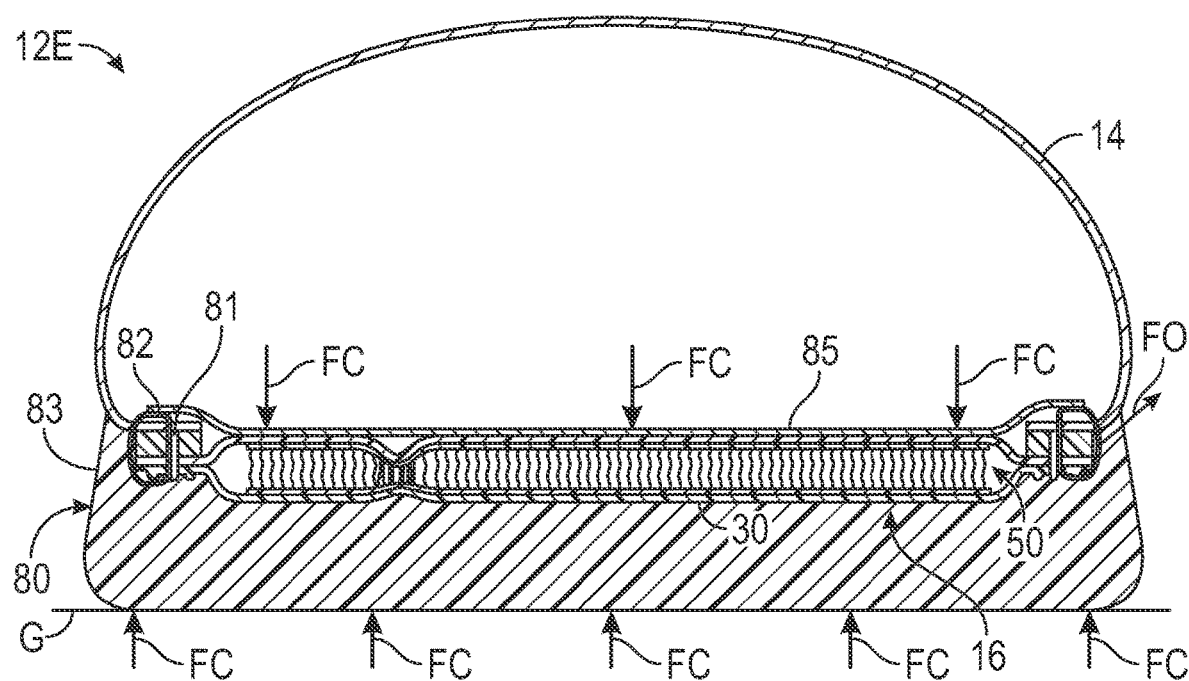
FIG. 33 is a schematic cross-sectional view of the article of footwear of FIG. 30 including an added layer overlying the strobel under dynamic compressive loading.

FIG. 33 shows an embodiment of the footwear 12E in which a protective cover layer 85 is secured over the proximal side of the strobel 10. The protective cover layer 85 will thus be disposed within the foot-receiving cavity 39. The protective cover layer 85 may be an abrasion resistant material to protect the bladder 16 from shear forces and/or from sharp objects. The protective cover layer may be formed from, for example, a polymeric sheet, a fabric layer, or other protective layer that may protect the bladder 16 from shear forces (e.g., by minimizing (or keeping sufficiently low) a coefficient of friction between the abrasion resistant material of the protective cover layer 85 and the bladder 16) in addition to protecting the bladder 16 from sharp objects.

FIGS. 6-26 show various embodiments of strobels 10, 10AA, 10A, 10B, 10C, 10D, 10E, 10F, 10G, 10H, 10I, within the scope of the present teachings. The strobels each include a polymeric bladder 16, 16A, 16B, 16D, 16E, 16F, 16G, 16H, or 16I configured with a flange 20 having a groove 22, and with a tensile component 50 as described with respect to FIGS. 1-3. The strobels each also include a lasting component that is secured to the polymeric bladder. The polymeric bladder with the tensile component 50 in the interior cavity 18, and the lasting component secured to the polymeric bladder together constitute a formed strobel that is subsequently secured to an upper as described herein.

Referring to FIGS. 8-10, a strobel 10 includes the polymeric bladder 16 of FIGS. 1-4 with the tensile component 50 therein and a lasting component 17 secured to the peripheral flange 20. More specifically, the lasting component 17 (and any other lasting components disclosed herein) may be one of a woven or non-woven textile, an elastomer, or foam backed with a textile layer. The lasting component 17 is thinner (i.e., less tall) than the height of the portion of the polymeric bladder 16 that has the tensile component 50 in the interior cavity 18 and may be generally easier to grip during stitching of the strobel 10 to the footwear upper 14. By adding one or more lasting components, stress on the bladder due to stitching may be minimized.

As shown in FIG. 10, the lasting component 17 has an aperture 19. The aperture 19 is sized so that the polymeric bladder 16 extends partially through the aperture 19, and the peripheral flange 20 abuts the lasting component 17 around the aperture 19. For example, as shown in FIG. 27, the lasting component 17 overlays and abuts the flange 20, and a portion of the second polymeric sheet 30 at the inflated portion of the polymeric bladder 16 extends through the aperture 19. As best shown in FIGS. 8 and 27, the outer edge 90 of the flange 20 extends laterally outward of the aperture 19, and an outer edge 91 of the lasting component 17 extends laterally outward of the outer edge 90 of the flange 20. The outer edge 90 falls along the phantom boundary 91A in FIG. 10. Stated differently, the polymeric bladder 16 is wider than the aperture 19, and the lasting component 17 is wider than the polymeric bladder 16. In an alternative embodiment shown in FIGS. 29 and 30, a lasting component 17A is alike in all aspects as lasting component 17 except that it is the same width as the polymeric bladder 16 so that its outer edge 91 is aligned with the outer edge 90 of the polymeric bladder 16.

The lasting component 17 is configured to extend along the peripheral flange 20 around the perimeter 21 of the interior cavity 18. In the embodiment of FIGS. 8-10 and 27-30, the lasting component 17 has a forefoot region 25, a midfoot region 27, and a heel region 29 corresponding with the forefoot region 25, the midfoot region 27, and the heel region 29 of the polymeric bladder 16. The aperture 19 and the polymeric bladder 16 extend in each of the forefoot region 25, the midfoot region 27, and the heel region 29.

The lasting component 17 has locating features 93G that may be apertures or markings in the lasting component 17, or notches in or protrusions at the peripheral edge of the lasting component 17 that are spaced from one another with the same relative spacing as the notches 93A or other locating features of the polymeric bladder 16. The locating features 93A are aligned with the locating features 93G when the polymeric bladder 16 is placed at the aperture 19. This positions the flange 20 correctly relative to the lasting component 17 for subsequent stitching through the flange 20. Alternatively, instead of or in addition to notches 93A, locating features on the polymeric bladder 16 may be one or more apertures 93D welded through the flange 20, as shown in FIG. 33-38. An alignment pattern could be printed on the polymeric bladder 16 and used for alignment with corresponding alignment features of the lasting component 17, the upper 14, or the last 84 in some embodiments. In addition to promoting flexibility of the polymeric bladder 16, 16B, etc., the weld pattern of the inwardly-protruding bonds 70 (e.g., the pattern of the resulting grooves 74 and recesses 76) may be used for alignment with the lasting component 17, the last 84 and/or the upper 14 similarly to a printed alignment pattern could.

The lasting component 17 is stitched or otherwise secured to the polymeric bladder 16 with stitches that extend through the flange 20 at the groove 22. The groove 22 serves as a guide path for an operator or for a machine, including a robotic machine, to follow when stitching or otherwise securing the lasting component 17 to the polymeric bladder 16. As shown in FIGS. 8 and 27, a first series of stitches 81 extends through the lasting component 17 and through the peripheral flange 20 in the groove 22 and secure the lasting component 17 to the polymeric bladder 16. The first series of stitches 81 and the groove 22 both extend completely around and outward of the perimeter 21 of the interior cavity 18 of the polymeric bladder 16. Only some of the stitches 81 are indicated with a reference number.

As shown in FIG. 27, the strobel 10 having the polymeric bladder 16 secured to the lasting component 17 is secured to the upper 14 by a second series of stitches 82 that extends through the lasting component 17 and through the upper 14, but not through the polymeric bladder 16.

Figure 14:
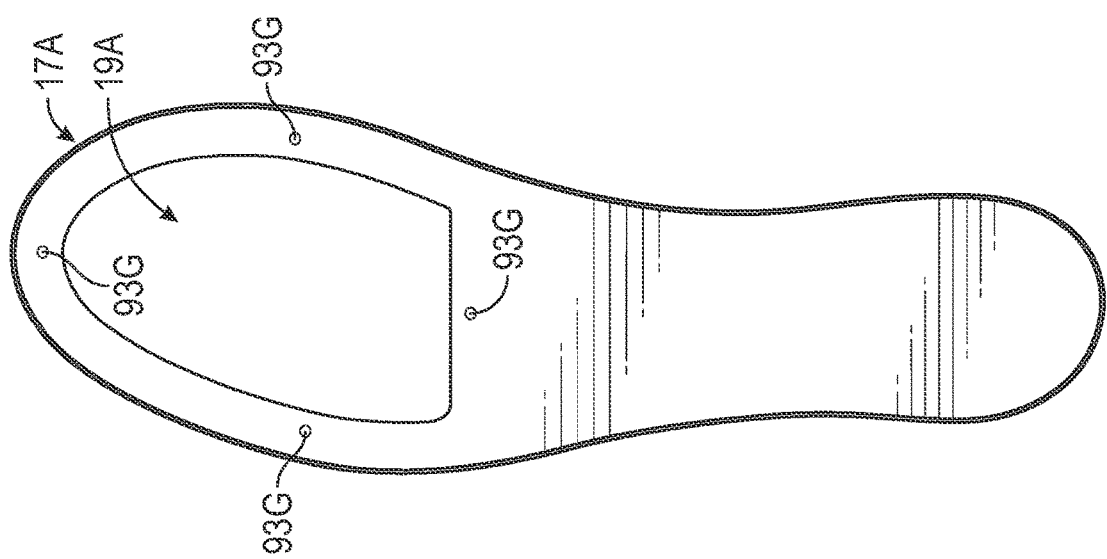
FIG. 14 is a schematic illustration in bottom view of the lasting component of FIG. 12.
Figure 13:
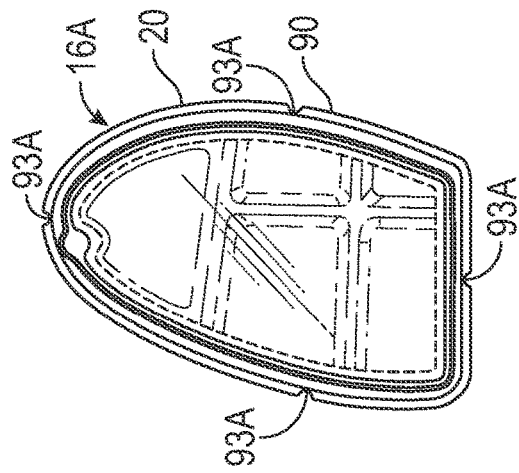
FIG. 13 is a schematic illustration in bottom view of the polymeric bladder of FIG. 12.
Figure 12:
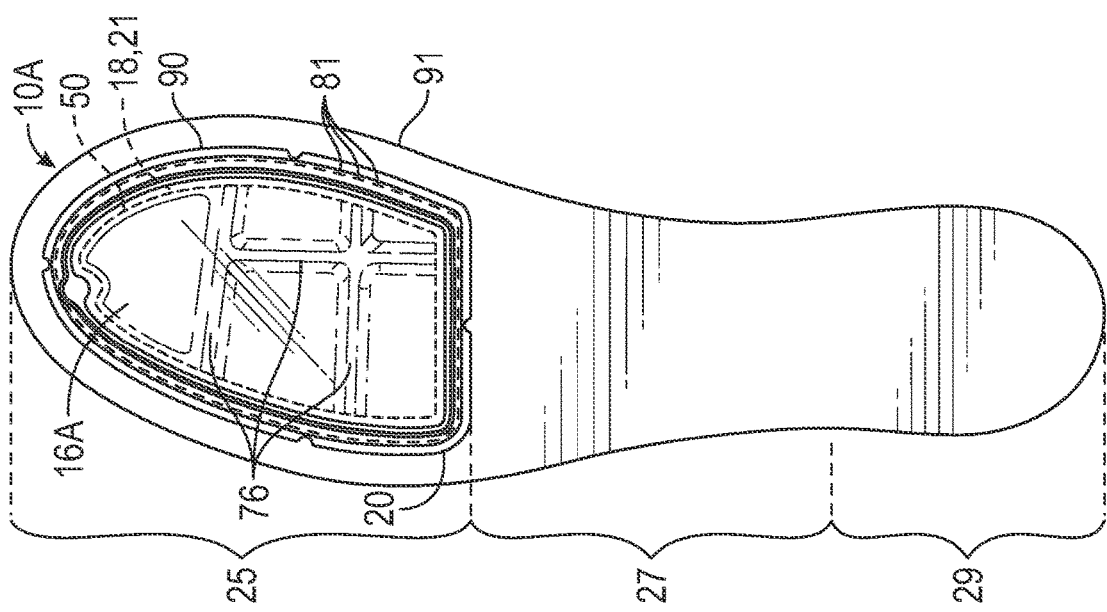
FIG. 12 is a schematic illustration in bottom view of a strobel including a polymeric bladder and a lasting component stitched to the polymeric bladder.

FIGS. 12-14 show another embodiment of a strobel 10A that includes a polymeric bladder 16A with a tensile component 50 therein and a lasting component 17A secured to the peripheral flange 20 of the polymeric bladder 16A by a first series of stitches 81 that extends through the peripheral flange 20 and the lasting component 17A. The first series of stitches 81 and the groove 22 both extend completely around and outward of the perimeter 21 of interior cavity 18.

As shown in FIG. 14, the lasting component 17A has an aperture 19A. The aperture 19A is sized so that the polymeric bladder 16A extends partially through the aperture 19A, and the peripheral flange 20 abuts the lasting component 17A around the aperture 19A, similar to lasting component 17 and flange 20 shown in FIG. 27. The outer edge 90 of the flange 20 extends laterally outward of the aperture 19A, and an outer edge 91 of the lasting component 17A extends laterally outward of the outer edge 90 of the flange 20.

The lasting component 17A is configured to extend along the peripheral flange 20 around the perimeter 21 of the interior cavity 18. In the embodiment of FIGS. 12-14, the lasting component 17A has a forefoot region 25, a midfoot region 27, and a heel region 29. The aperture 19A extends in the forefoot region 25 and may extend partially in the midfoot region 27. The polymeric bladder 16A is configured to extend in the forefoot region 25, and partially in the midfoot region 27 if the aperture extends into the midfoot region 27 but does not extend in the heel region 29.

The lasting component 17A has locating features 93G that may be apertures in or markings on the lasting component 17A, or notches in or protrusions at the inner peripheral edge of the lasting component 17A bounding the aperture 19A, that are spaced from one another with the same relative spacing as the notches 93A or other locating features of the polymeric bladder 16A. The locating features 93A are aligned with the locating features 93G when the polymeric bladder 16A is placed at the aperture 19A. Similar to lasting component 17, the lasting component 17A is stitched or otherwise secured to the polymeric bladder 16A with a first series of stitches 81 that extends through the flange 20 at the groove 22. The first series of stitches 81 and the groove 22 both extend completely around and outward of the perimeter 21 of interior cavity 18 of the polymeric bladder 16A. Similar to strobel 10, the strobel 10A having the polymeric bladder 16A secured to the lasting component 17A may be secured to the upper 14 by a second series of stitches 82 that extends through the lasting component 17A and the upper 14 but not through the polymeric bladder 16A.

Figure 17:
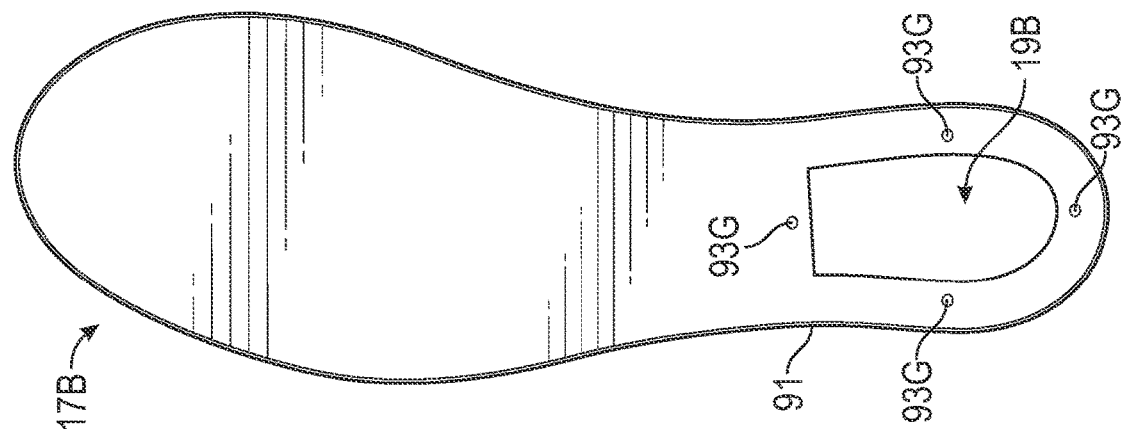
FIG. 17 is a schematic illustration in bottom view of the lasting component of FIG. 15.
Figure 16:
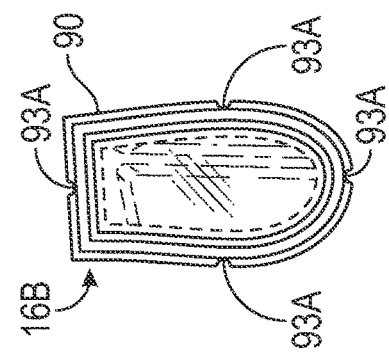
FIG. 16 is a schematic illustration in bottom view of the polymeric bladder of FIG. 15.
Figure 15:
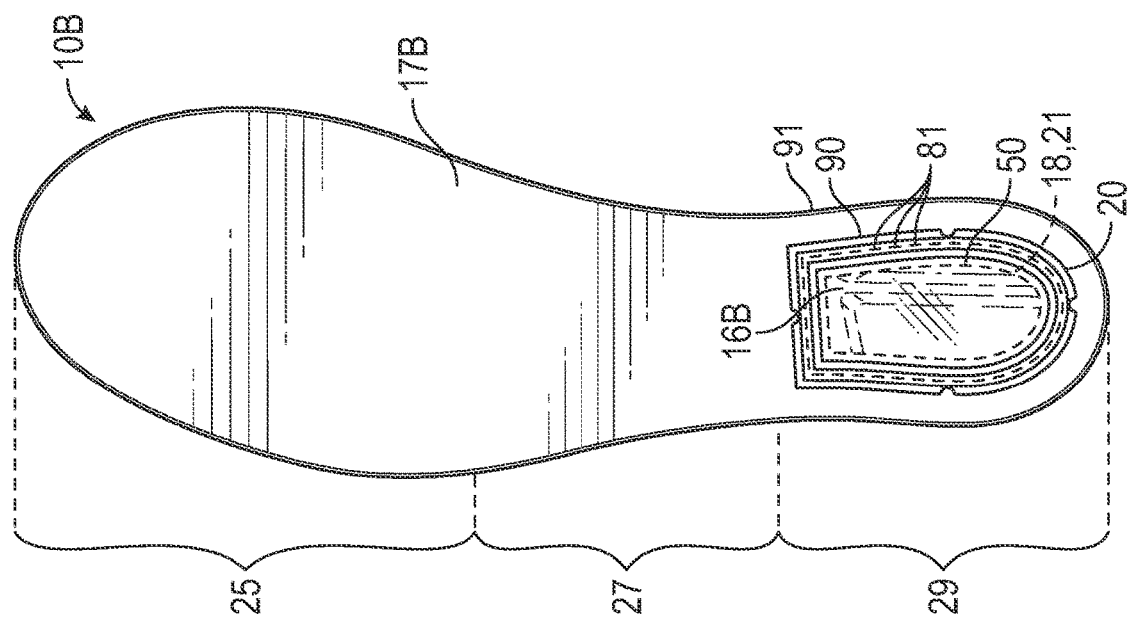
FIG. 15 is a schematic illustration in bottom view of a strobel including a polymeric bladder and a lasting component stitched to the polymeric bladder.

FIGS. 15-17 show another embodiment of a strobel 10B that includes a polymeric bladder 16B with a tensile component 50 therein and a lasting component 17B secured to the peripheral flange 20 of the polymeric bladder 16B by a first series of stitches 81 that extends through the peripheral flange 20 and the lasting component 17B. The first series of stitches 81 and the groove 22 both extend completely around and outward of the perimeter 21 of interior cavity 18.

As shown in FIG. 17, the lasting component 17B has an aperture 19B. The aperture 19B is sized so that the polymeric bladder 16B extends partially through the aperture 19B, and the peripheral flange 20 abuts the lasting component 17B around the aperture 19B, similarly to lasting component 17 and flange 20 shown in FIG. 25. The outer edge 90 of the flange 20 extends laterally outward of the aperture 19B, and an outer edge 91 of the lasting component 17B extends laterally outward of the outer edge 90 of the flange 20.

The lasting component 17B is configured to extend along the peripheral flange 20 around the perimeter 21 of the interior cavity 18. In the embodiment of FIGS. 15-17, the lasting component 17B has a forefoot region 25, a midfoot region 27, and a heel region 29. The aperture 19B extends in the heel region 29. The polymeric bladder 16B is configured to extend in the heel region 29 but does not extend in the midfoot region 27 or forefoot region 25.

The lasting component 17B has locating features 93G that may be apertures in or markings on the lasting component 17B, or notches in or protrusions at the inner peripheral edge of the lasting component 17B bounding the aperture 19B, that are spaced from one another with the same relative spacing as the notches 93A or other locating features of the polymeric bladder 16B. The locating features 93A are aligned with the locating features 93G when the polymeric bladder 16B is placed at the aperture 19B. Similar to lasting component 17, the lasting component 17B is stitched or otherwise secured to the polymeric bladder 16B with a first series of stitches 81 that extends through the flange 20 at the groove 22. The first series of stitches 81 and the groove 22 both extend completely around and outward of the perimeter 21 of interior cavity 18 of the polymeric bladder 16B. Similar to strobel 10, the strobel 10B having the polymeric bladder 16B secured to the lasting component 17B is secured to the upper 14 by a second series of stitches 82 that extends through the lasting component 17B and through the upper 14, but not through the polymeric bladder 16B.

FIGS. 18-20 and 31-32 show another embodiment of a strobel 10C that includes the polymeric bladder 16 with the tensile component 50 therein and a lasting component 17C secured to the peripheral flange 20 of the polymeric bladder 16 by a first series of stitches 81 that extends through the peripheral flange 20 and the lasting component 17C. The first series of stitches 81 and the groove 22 both extend completely around and outward of the perimeter 21 of interior cavity 18.

Figure 31:
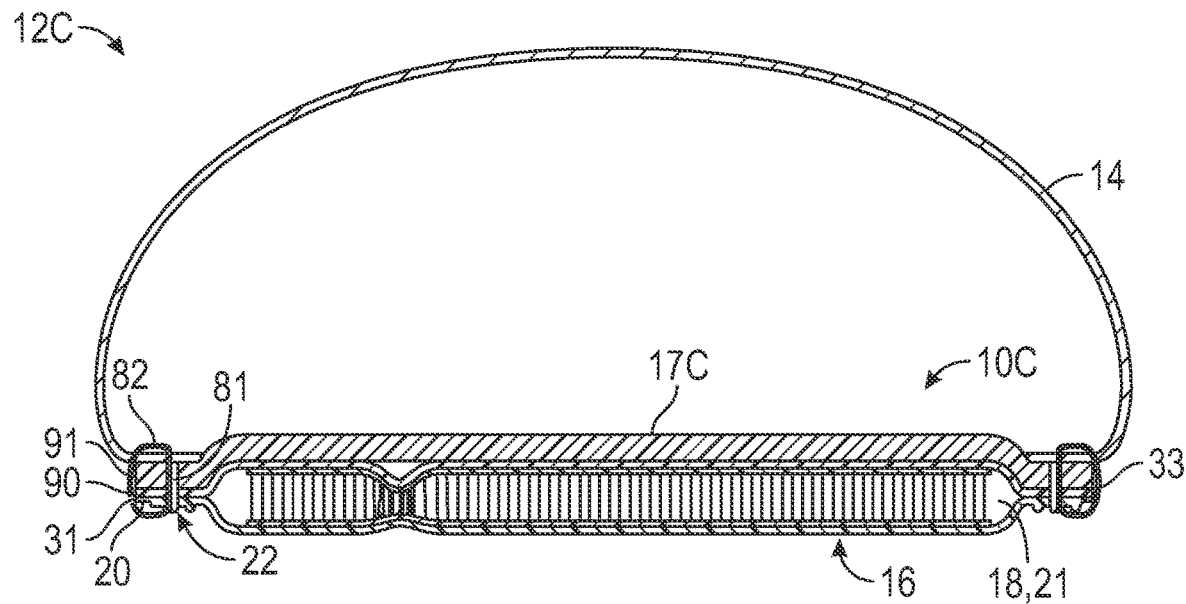
FIG. 31 is a cross-sectional view of the strobel of FIG. 18 taken at lines 31-31 in FIG. 18, inverted relative to FIG. 18 and secured to a footwear upper.
Figure 32:
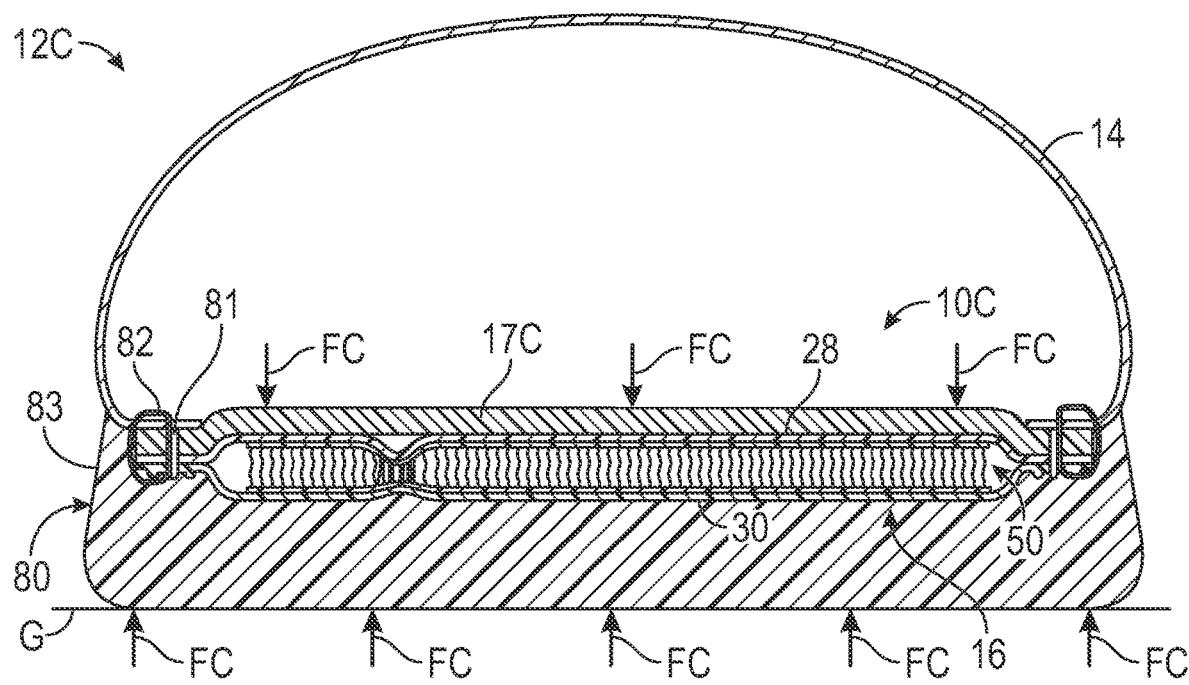
FIG. 32 is a cross-sectional view of an article of footwear including the strobel and upper of FIG. 31 and a midsole under dynamic compressive loading.

As shown in FIG. 31, the lasting component 17C is sized so that the peripheral flange 20 abuts the lasting component 17C, and the lasting component 17C overlays and extends across the polymeric bladder 16 between a medial side 31 of the polymeric bladder and a lateral side 33 of the polymeric bladder. As best shown in FIG. 31, the outer edge 90 of the flange 20 is aligned with the outer edge 91 of the lasting component 17C as the polymeric bladder 16 and the lasting component 17C are the same width. The lasting component 17C is configured to extend along the peripheral flange 20 around the perimeter 21 of the interior cavity 18. In the embodiment of FIGS. 18-20, the lasting component 17C and the polymeric bladder 16 both have a forefoot region 25, a midfoot region 27, and a heel region 29, and the lasting component 17C does not have an aperture through which the polymeric bladder 16 extends.

The lasting component 17C has locating features 93G that are apertures or notches in or protrusions at the outer periphery of the lasting component 17C spaced from one another with the same relative spacing as the notches 93A or other locating features of the polymeric bladder 16. The locating features 93A are aligned with the locating features 93G when the lasting component 17C is placed against the polymeric bladder 16, and the lasting component 17C is stitched to the polymeric bladder 16 with a first series of stitches 81 that extends through the flange 20 and the lasting component 17C at the groove 22. The first series of stitches 81 and the groove 22 both extend completely around and outward of the perimeter 21 of interior cavity 18 of the polymeric bladder 16. Unlike strobel 10, the strobel 10C having the polymeric bladder 16 secured to the lasting component 17C is secured to the upper 14 by a second series of stitches 82 that extend through the lasting component 17C and through the upper 14, and also through the flange 20 of the polymeric bladder 16 in the groove 22 as shown in FIG. 31. Both the first series of stitches 81 and the second series of stitches 82 extend through the polymeric bladder 16 in the groove 22.

In some embodiments, the lasting component and the polymeric bladder both extend the entire width of the strobel, but neither extends the entire length, and the lasting component and the polymeric bladder are arranged longitudinally along the strobel. For example, in the embodiments of FIGS. 21-26, the polymeric bladder and the lasting component are each disposed in at least one different one of a forefoot region, a midfoot region, and a heel region of the strobel, and the lasting component is secured to the polymeric bladder by a first series of stitches extending transversely across the polymeric bladder and the lasting component.

Figure 21:
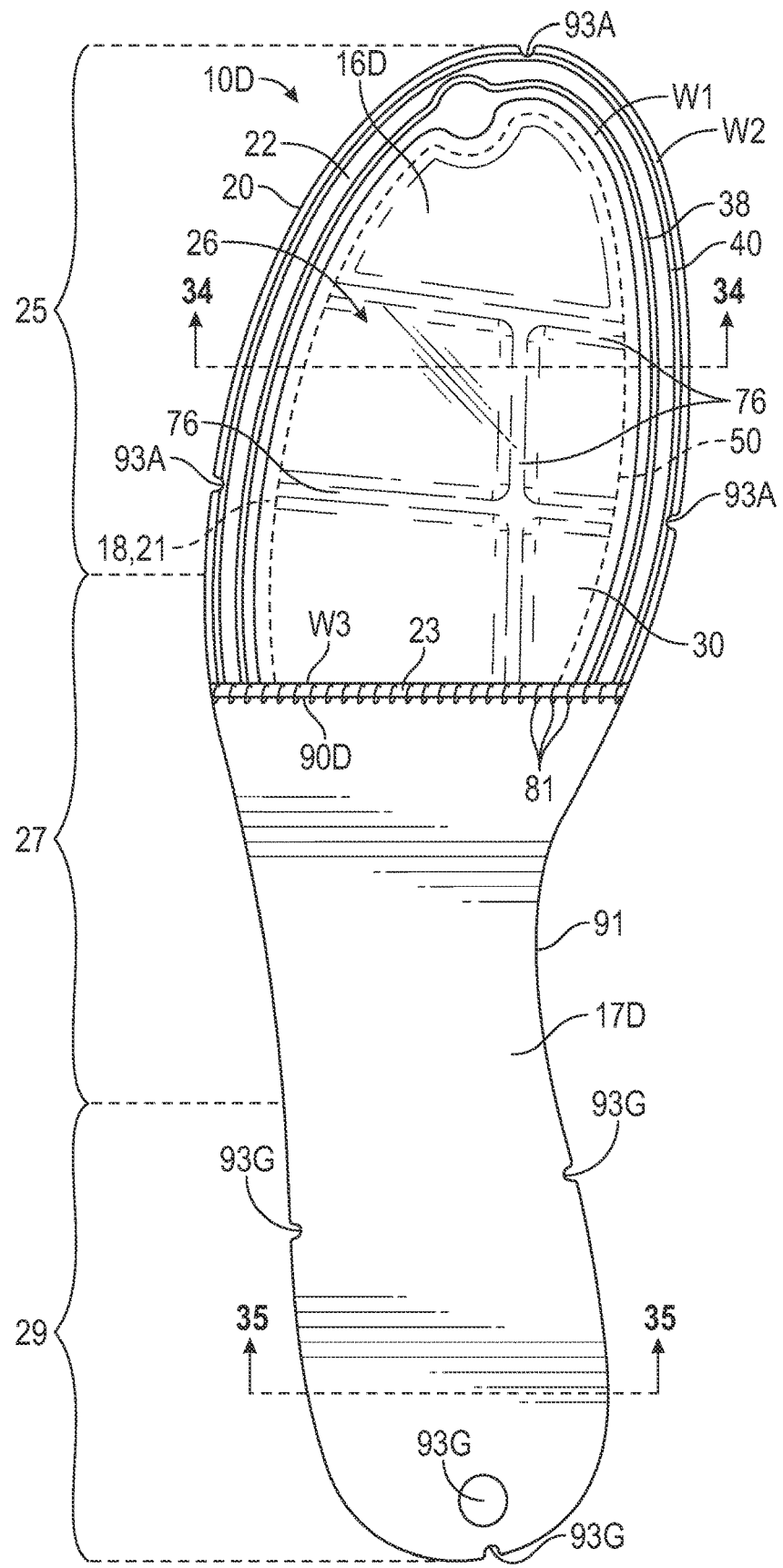
FIG. 21 is a schematic illustration in bottom view of a strobel including a polymeric bladder and a lasting component stitched to the polymeric bladder.

Referring to FIG. 21, the polymeric bladder 16D is disposed in the forefoot region 25 and may extend slightly into the midfoot region 27. The lasting component 17D extends in the heel region 29 and in the midfoot region 27 where a forward transverse edge 23 of the lasting component 17D abuts or slightly overlaps a rearward transverse edge 90D of the polymeric bladder 16D. The groove 22 does not extend across the polymeric bladder 16D at the rearward transverse edge 90D. The polymeric bladder 16D may be formed by cutting the polymeric bladder 16 and adding a transversely-extending weld W3 to seal the interior cavity 18 where cut. The first series of stitches 81 extends transversely across the strobel 10D through the polymeric bladder 16D rearward of the weld W3 to secure the lasting component 17D to the polymeric bladder 16D. A subsequent second series of stitches to secure the strobel 10D to the upper 14 would extend through the polymeric bladder 16D in the groove 22 around the polymeric bladder 16D to the rearward transverse edge 90D and would continue around the periphery of the lasting component 17D near the outer edge 91, rearward of the series of stitches 81.

The locating features of the polymeric bladder 16D (e.g., the notches 93A, protrusions, the pattern of inwardly-protruding bonds 70 of the bladder, or a printed alignment pattern on the bladder) and locating features 93G of the lasting component 17D are used to align the strobel 10D to the upper 14 when the strobel 10D is secured to the upper 14. The outer edge 90 of the polymeric bladder 16D forms the outer edge of the strobel 10D in the forefoot region 25 and in a forward part of the midfoot region 27, and the outer edge 91 of the lasting component 17D forms the outer edge of the strobel 10D in the rearward part of the midfoot region 27 and in the heel region 29.

Figure 34:
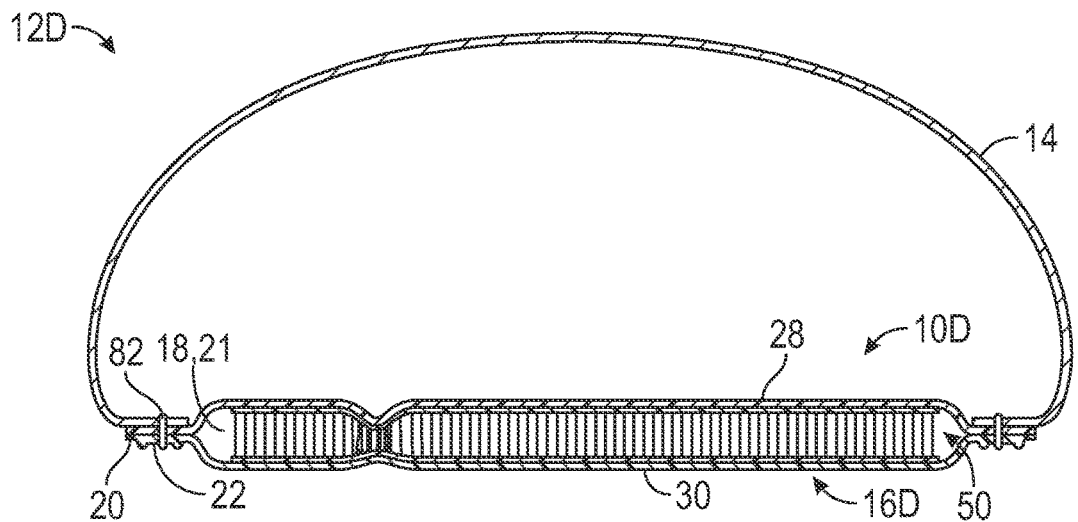
FIG. 34 is a cross-sectional view of the strobel of FIG. 21 taken at lines 34-34 in FIG. 21, inverted relative to FIG. 21 and secured to a footwear upper.
Figure 35:
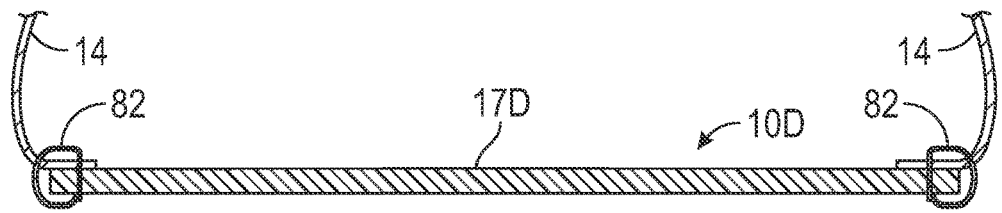
FIG. 35 is a cross-sectional view of the strobel of FIG. 21 taken at lines 35-35 in FIG. 21, inverted relative to FIG. 21 and secured to a footwear upper.

Cross-sectional views of the strobel 10D when secured to the upper 14 are shown in FIGS. 34 and 35. In the forefoot region 25 (FIG. 34), the strobel 10D includes only the polymeric bladder 16D and tensile component 50. In the heel region (FIG. 35), the strobel 10D includes only the lasting component 17D. The article of footwear 12D includes the sole structure 80 including the midsole 83 (not shown in FIGS. 34 and 35) which would be secured to the distal side of the polymeric bladder 16D and a lower extent of the upper 14 at the polymeric bladder 16D, and to the distal side of the lasting component 17D and a lower extent of the upper 14 at the lasting component 17D.

Figure 22:
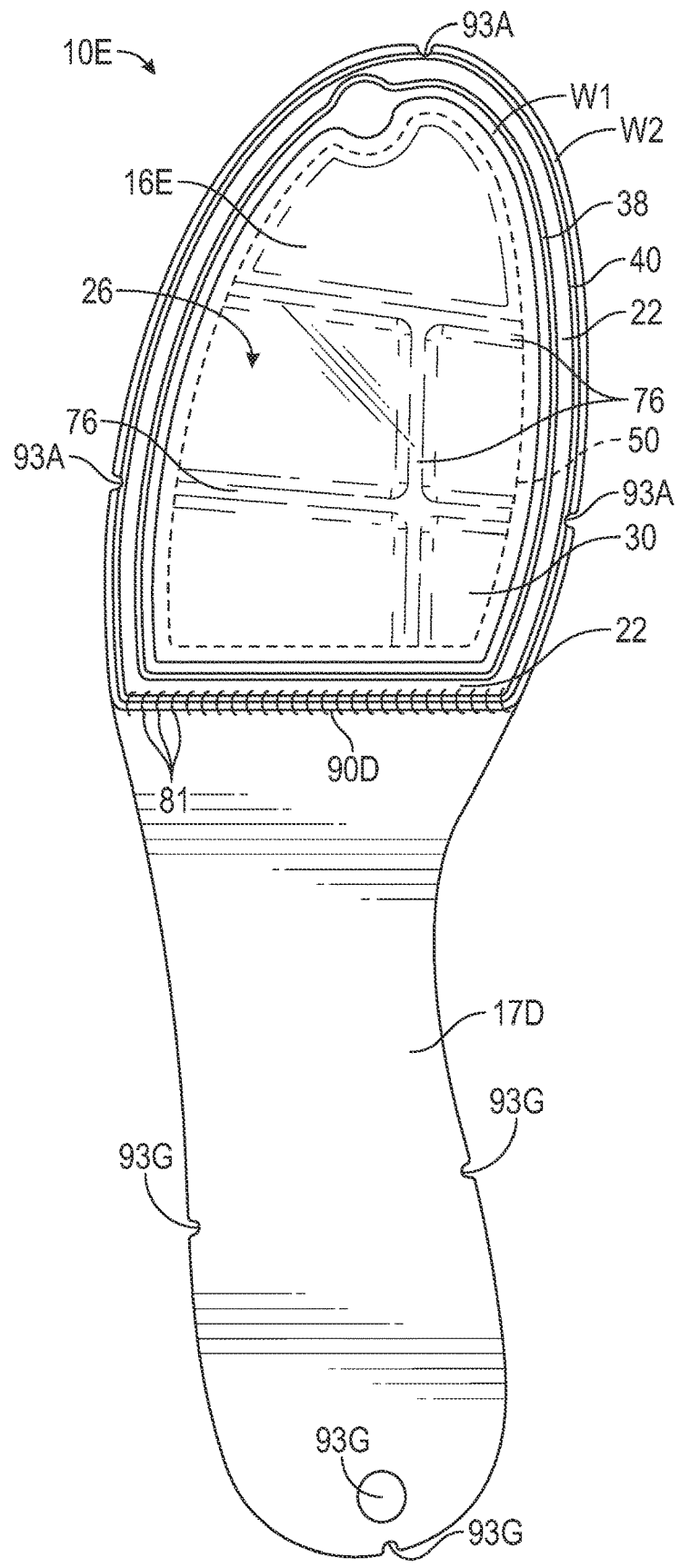
FIG. 22 is a schematic illustration in bottom view of a strobel including a polymeric bladder and a lasting component stitched to the polymeric bladder.

FIG. 22 shows a strobel 10E configured the same as described with respect to strobel 10D except that the polymeric bladder 16D is replaced with a polymeric bladder 16E that has a flange 20 with a groove 22 that extends completely around the polymeric bladder 16E, including at the rearward transverse edge 90D. In other words, the polymeric bladder 16E is formed to the size shown, rather than being cut from a longer polymeric bladder 16 and then welded at weld W3. The first series of stitches 81 securing the lasting component 17D at the rearward transverse edge 90D extends through the flange 20 at the groove 22.

Figure 23:
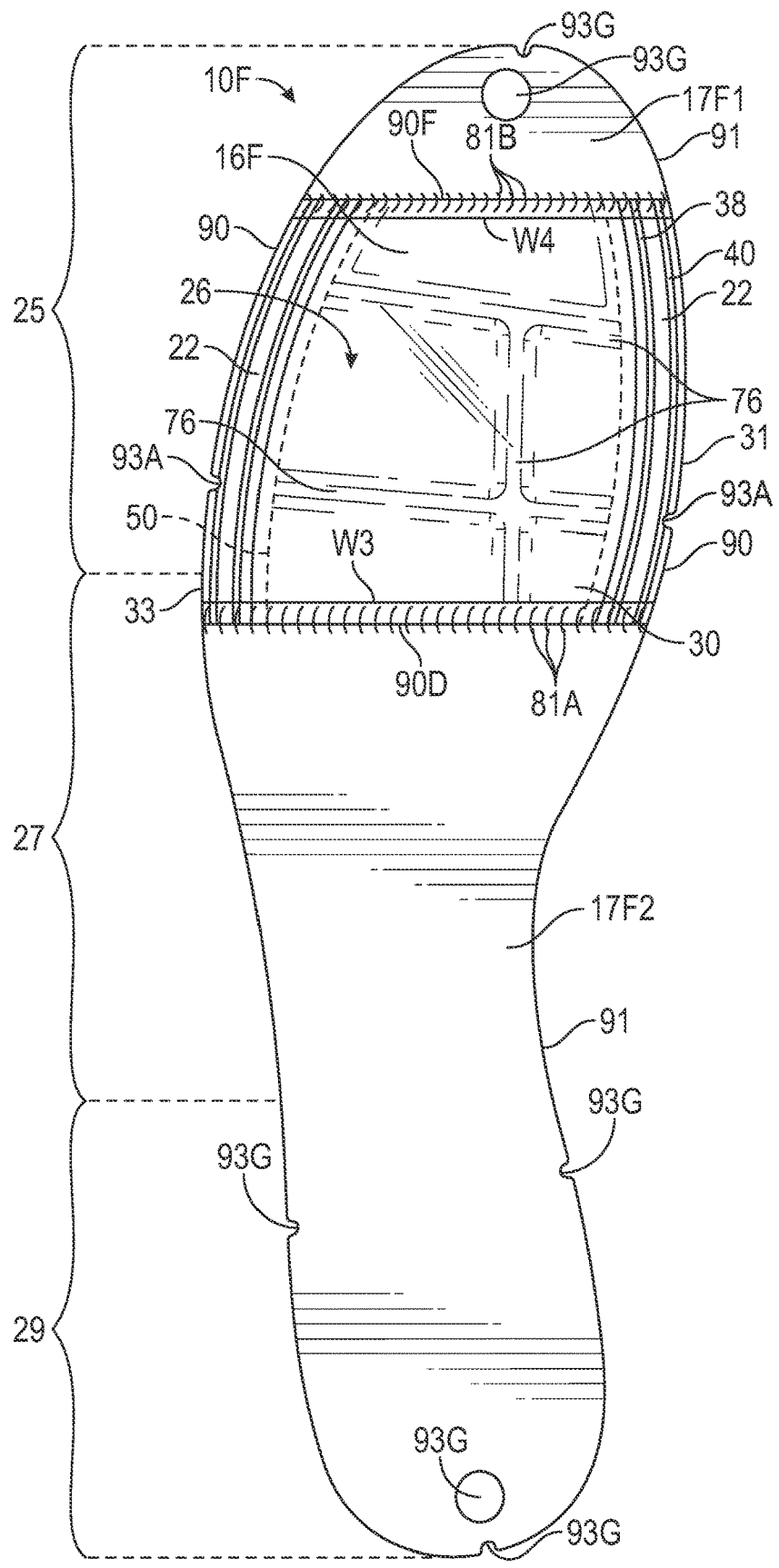
FIG. 23 is a schematic illustration in bottom view of a strobel including a polymeric bladder and a lasting component stitched to the polymeric bladder.

FIG. 23 shows a strobel 10F with a polymeric bladder 16F cut from the polymeric bladder 16 at rearward transverse edge 90D and also at a forward transverse edge 90F. The polymeric bladder 16F is welded at weld W3 and also at weld W4 to seal the interior cavity 18. The first series of stitches includes stitches 81A that extend transversely across the strobel 10F through the polymeric bladder 16F rearward of the weld W3 to secure a rear lasting component 17F2 to the polymeric bladder 16F. The first series of stitches also includes stitches 81B that extend transversely across the strobel 10F through the polymeric bladder 16F forward of the weld W4 to secure a front lasting component 17F1 to the polymeric bladder 16F. A subsequent second series of stitches to secure the strobel 10F to the upper 14 would extend through the polymeric bladder 16F in the groove 22 at the medial side 31 and the lateral side 33 of the polymeric bladder 16F and would continue around rear lasting component 17F2 near the outer edge 91 rearward of the series of stitches 81A, and around the lasting component 17F1 forward of the stitches 81B. The outer edges 91 of the lasting components 17F1 and 17F2 and the outer edges 90 of the polymeric bladder 16F form the outer edge of the strobel 10F. The lasting components 17F1, 17F2 each have at least one locating feature 93G that is an aperture or a notch (or a protrusion or marking) that can be aligned with similarly spaced locating features on the upper 14, as can notches 93A or other locating features in the polymeric bladder 16F, when the strobel 10F is stitched to the upper 14.

Figure 24:
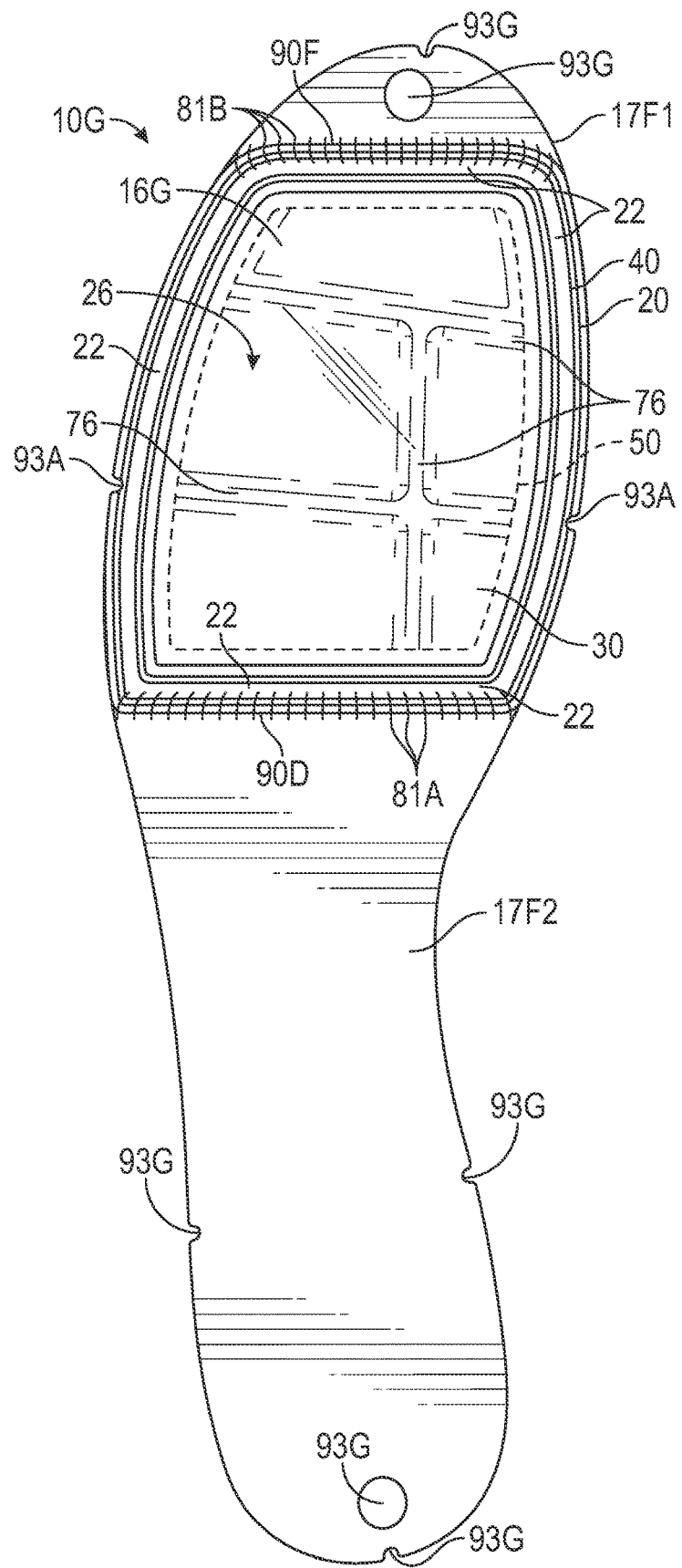
FIG. 24 is a schematic illustration in bottom view of a strobel including a polymeric bladder and a lasting component stitched to the polymeric bladder.

FIG. 24 shows a strobel 10G configured the same as described with respect to strobel 10F except that the polymeric bladder 16F is replaced with a polymeric bladder 16G that has a flange 20 with a groove 22 extending completely around the polymeric bladder 16G, including at the rearward transverse edge 90D and the forward transverse edge 90F. In other words, the polymeric bladder 16G is formed to the size shown, rather than being cut from a longer polymeric bladder 16 and then welded at welds W3 and W4. The first series of stitches 81A, 81B securing the lasting components 17F2, 17F1 at the rearward transverse edge 90D and the forward transverse edge 90F, respectively, extends through the flange 20 at the groove 22.

Figure 25:
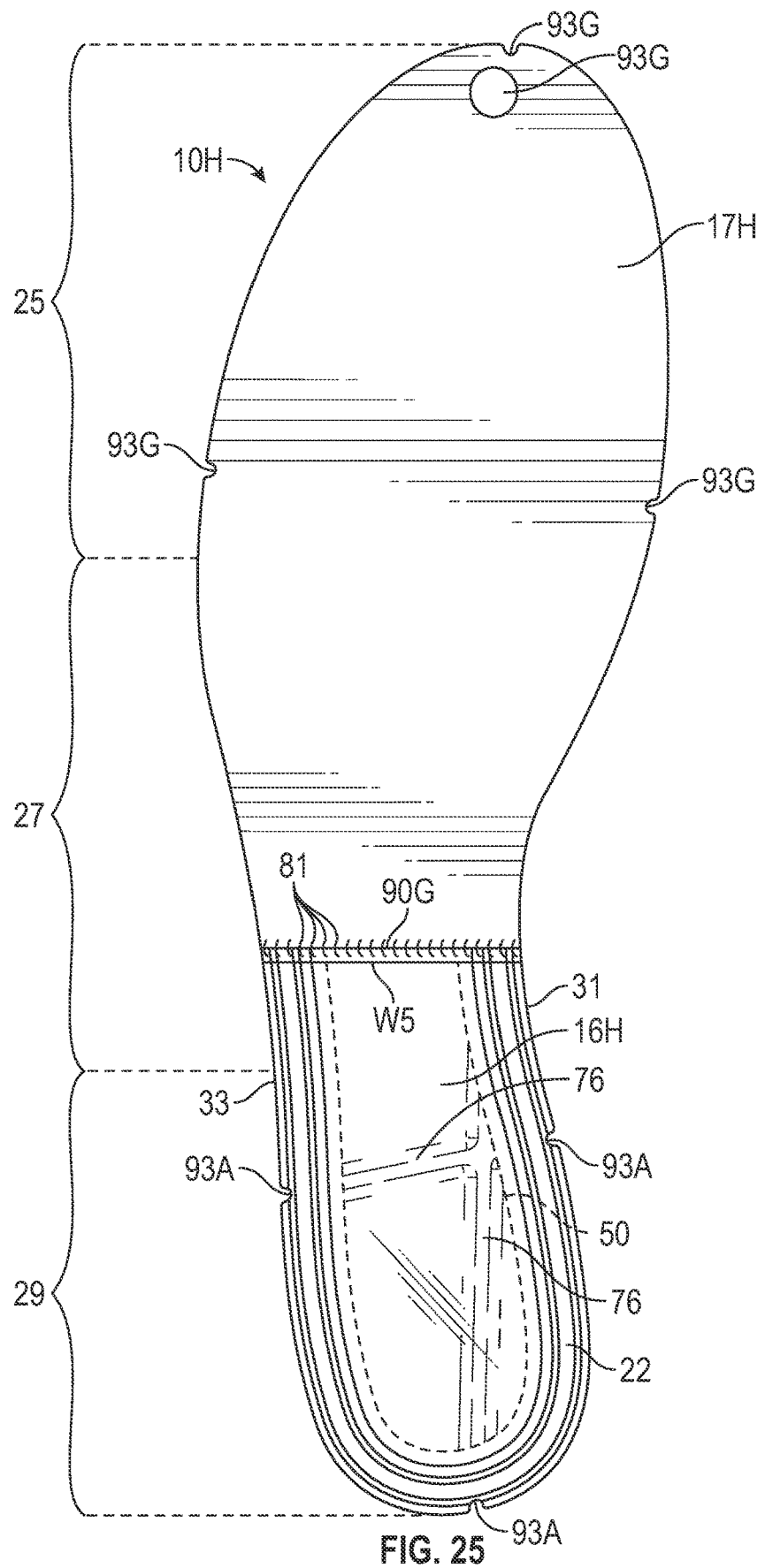
FIG. 25 is a schematic illustration in bottom view of a strobel including a polymeric bladder and a lasting component stitched to the polymeric bladder.

FIG. 25 shows a strobel 10H configured similarly to the strobel 10D except that the polymeric bladder 16H is in the heel region 29 and a rear portion of the midfoot region 27, and the lasting component 17H is in the forefoot region 25 and a forward portion of the midfoot region 27. The polymeric bladder 16H may be cut from the polymeric bladder 16 and welded at transverse weld W5 to seal the interior cavity 18, and then the lasting component 17H is stitched to the polymeric bladder 16H at a forward transverse edge 90G of the polymeric bladder 16H with a first series of stitches 81 that extends transversely across the strobel 10H from the medial side 31 to the lateral side 33 of the polymeric bladder 16H, and are forward of the weld W5.

Figure 26:
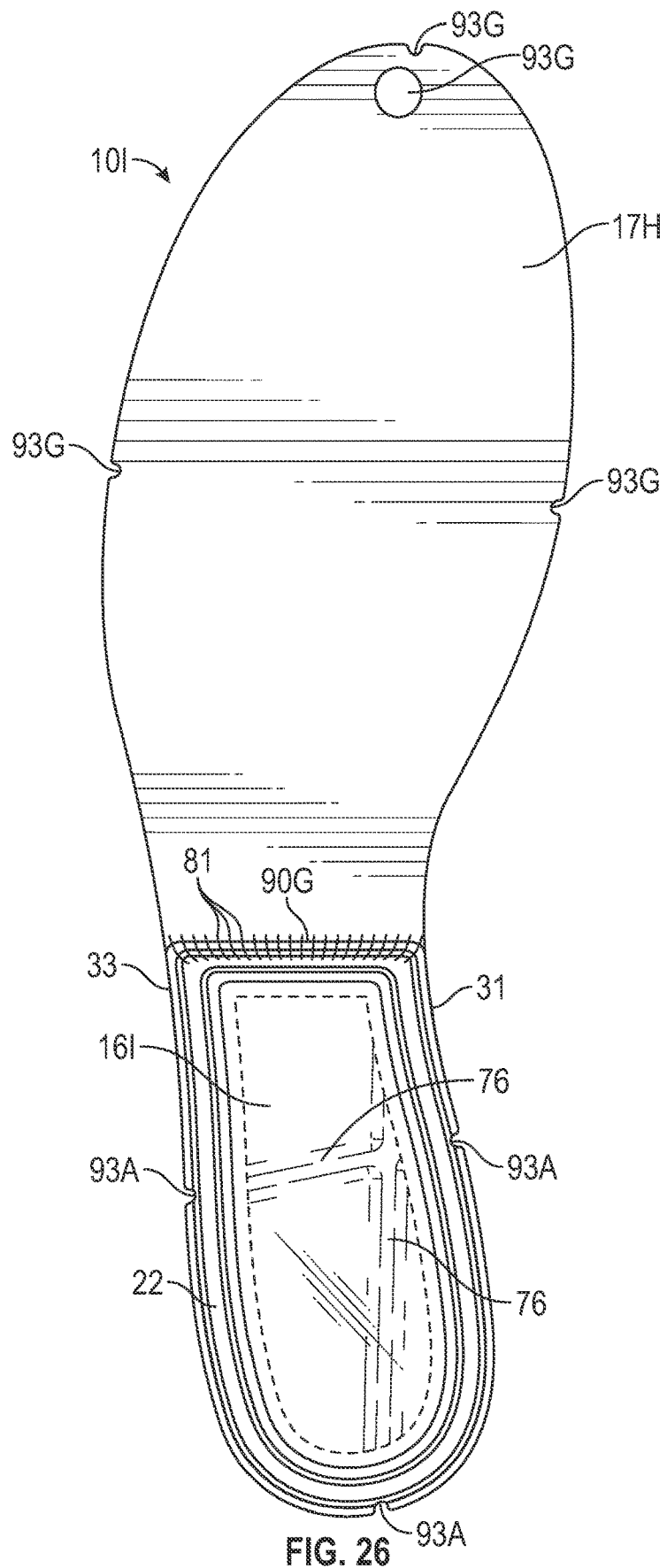
FIG. 26 is a schematic illustration in bottom view of a strobel including a polymeric bladder and a lasting component stitched to the polymeric bladder.

FIG. 26 shows a strobel 10I configured the same as described with respect to strobel 10H except that the polymeric bladder 16H is replaced with a polymeric bladder 16I that has a flange 20 with a groove 22 extending completely around the polymeric bladder 16I, including at the forward transverse edge 90G. In other words, the polymeric bladder 16I is formed to the size shown, rather than being cut from a longer polymeric bladder 16 and then welded at weld W5. The first series of stitches 81 securing the lasting component 17H to the polymeric bladder 16I extends through the flange 20 at the groove 22 near the forward transverse edge 90G.

In the articles of footwear 12A, 12C, and 12D, the polymeric bladders 16, 16D are secured directly to the upper 14 by stitches 82 extending through the flange 20 at the groove 22. These configurations will tend to constrain the polymeric bladder in the X-Y plane during dynamic compression to a greater extent than the polymeric bladder 16 of the article of footwear 12, which is not directly secured to the upper 14 but is instead secured to the lasting component 17 by the first series of stitches 81, and stitches 82 extend only through the lasting component 17 and the upper 14.

Figure 42:
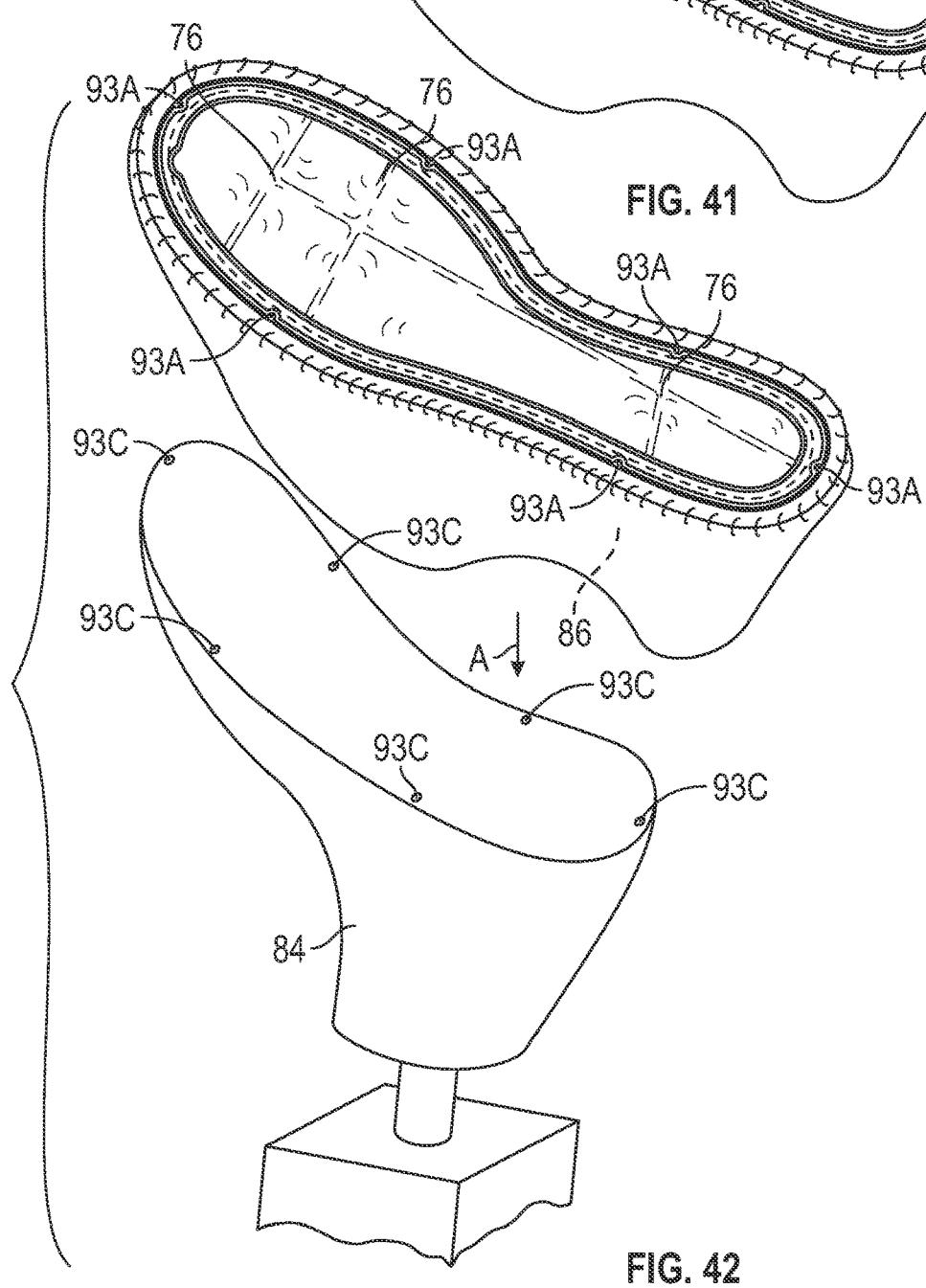
FIG. 42 is a schematic illustration of the strobel and upper of FIG. 41 being moved toward a footwear last.
Figure 43:
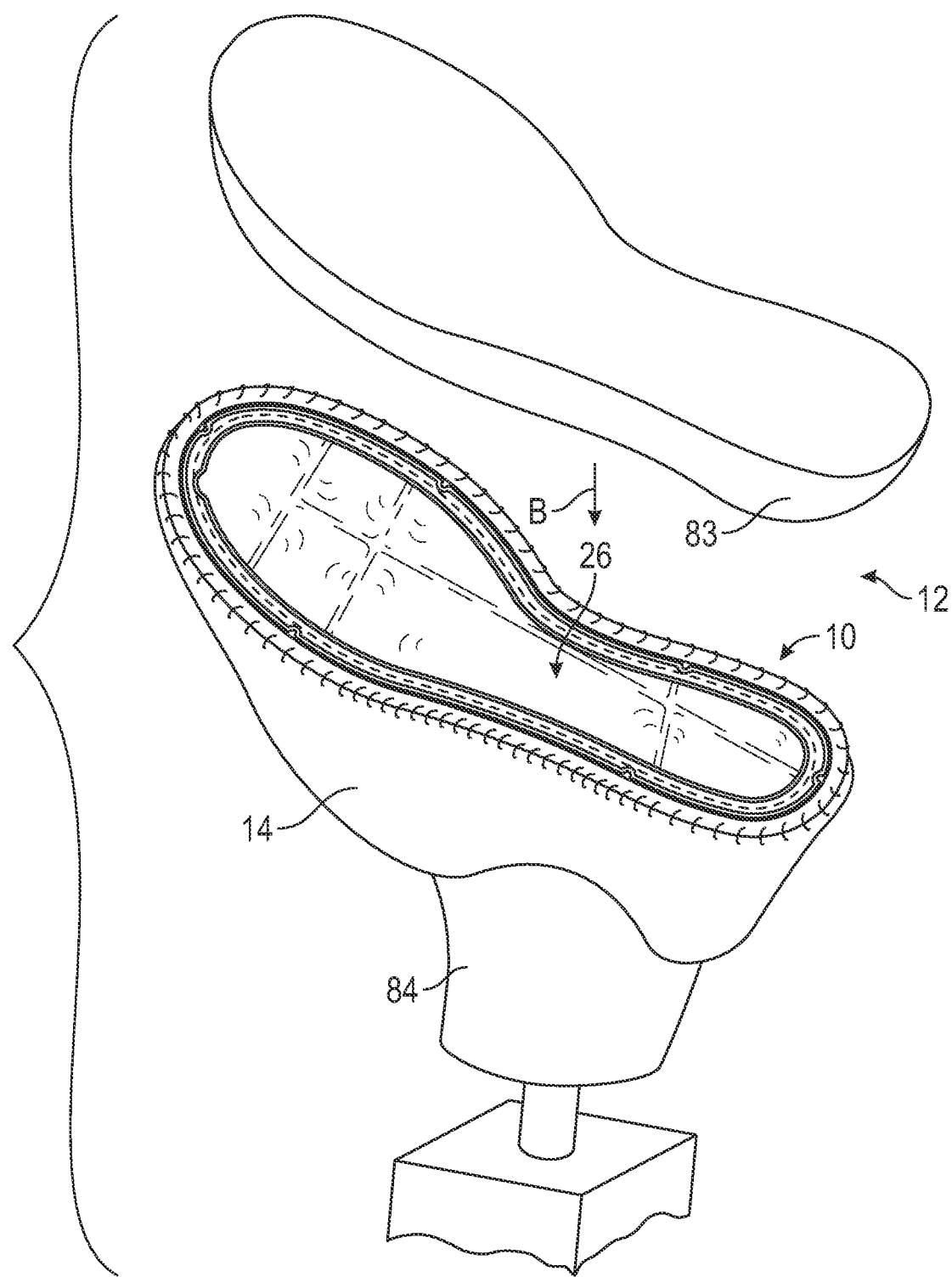
FIG. 43 is a schematic illustration of the strobel and upper of FIG. 42 on the footwear last and with the midsole of FIG. 28 being moved toward the strobel for securement to the strobel and the upper.

In each of the embodiments, the strobel 10 or any of the strobels 10AA-10I may be secured to the upper 14 as described, prior to placing a last 84 in the opening 86 formed by the upper 14 as illustrated in FIGS. 42-43. Stated differently, the upper 14 is not placed over the last 84 until after it has been secured to the strobel 10. It is desirable for manufacturing efficiency that securing the strobel 10 to the upper 14 is done accurately and relatively quickly. During this process, the strobel 10 or any of 10AA-10I is moved relative to the stitching needle, or vice versa so that the needle moves along and the stitches 82 proceed along the lasting component and/or the groove 22 (depending on the embodiment, as described herein).

To further improve the efficiencies of stitching the upper 14 to the strobel 10 or any of 10AA-10I, the polymeric bladder may be in an uninflated state when the stitching occurs. For example, in FIG. 39, the polymeric bladder 16 is uninflated when it is aligned with the upper 14 and then stitched to the upper 14 in FIG. 40. When in the uninflated state, the polymeric bladder 16 is more flexible, making it easier to manipulate the strobel 10 or any of 10AA-10I relative to the sewing machine that provides the stitches 82. After the upper 14 is secured to the strobel 10 by the series of stitches 82, the polymeric bladder 16 is inflated to a predetermined pressure, or is left at ambient pressure without inflating, and the interior cavity 18 is then sealed by plugging a port or fill tube of the polymeric bladder 16. Inflating and sealing may occur prior to placing the upper 14 with the strobel 10 stitched thereto on the last 84 because, in its inflated state, the strobel 10 and upper 14 are more representative of their final relative configuration before the sole structure 80 is attached, and can therefore enable a more accurate placement on the last 84 when a midsole 83 of the sole structure 80 is secured to the distal surface 26 of the strobel 10 and/or the lower periphery of the upper 14. In other embodiments, the polymeric bladder such as bladder 16 may be inflated and sealed prior to securing the bladder 16 to the upper 14.

Figure 39:
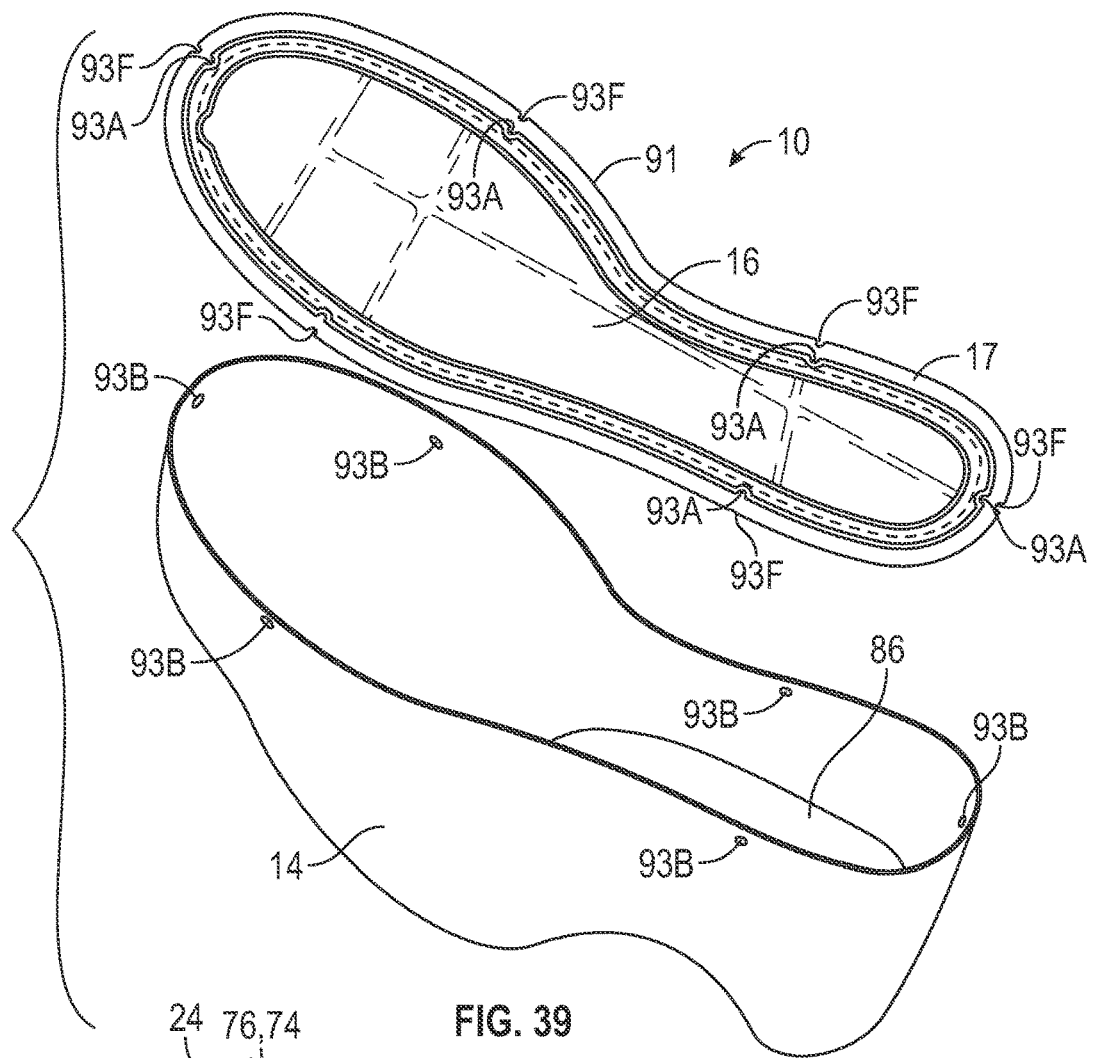
FIG. 39 is a schematic perspective illustration in exploded view of the strobel and upper of FIG. 23 before the strobel is stitched to the upper.

To increase the speed and precision with which the strobel 10 (or any of the strobels 10AA-10I) and the upper 14 are positioned on the last 84, the strobel 10 or any of 10AA-10I may be configured with a locating feature, as discussed. For example, as shown in FIG. 39, the lasting component 17 may have notches 93F spaced around the outer edge 91. The notches 93F may be formed by cutting, for example. The notches 93A in the bladder 16 may be formed by the mold portions 34A, 34B or the mold insert 34C or may be otherwise provided. As shown in FIGS. 36 and 38, the mold portion 34B has continuous inner and outer ridges 94, 96 that are spaced apart from one another, and together create the welds W1 and W2. The outer ridge 96 has notches 98, best shown in FIG. 38, that at least partially form the notches 93A of the polymeric bladder 16. In other embodiments that locating features of the bladder 16 or the locating features of the lasting component 17 may be protrusions, apertures, printed markings, etc. In the embodiment of the bladder 16AA shown in FIG. 6, the flange 20 has locating features 93H that are protrusions at the outer edge 90 of the peripheral flange 20. In other embodiments, a combination of notches and protrusions, or other markings may be used. In general, the various locating features described herein may be provided, for example, by welding, cutting, punching, printing, dyeing, etc.

Still further, lasers could be used to align features of the strobel 10 or any of 10AA-10I with the last 84. The strobel 10 or any of 10AA-10I could be aligned with the perimeter of the upper 14 using a separate jig. In some embodiments, the heel center (at the edge of the peripheral flange) could be aligned with a feature on the last. Additionally, in some embodiments, a pattern could be printed on the strobel 10 or any of 10AA-10I that can then be aligned with a pattern on the last 84. For example, the distal side of the strobel 10 could have an alignment pattern printed on it, as this side will be adhered to the midsole 83 so that the printed pattern will not be visible in the finished article of footwear. The printed alignment pattern may also be used for alignment with corresponding alignment features of the upper 14 in some embodiments. In addition to promoting flexibility of the strobel 10, 10AA-10I, etc., the weld pattern of the inwardly-protruding bonds 70 (e.g., the pattern of the resulting grooves 74 and recesses 76) may be used for alignment with the lasting component, the last 84 and/or the upper 14 just as a printed alignment pattern could be used for alignment purposes. The pattern of inwardly-protruding bonds 70 described herein, for example, could be aligned with a laser pattern (e.g., a light pattern) on the last 84 in the same manner as could a printed alignment pattern on the strobel.

The upper 14 may have locating features that are spaced markings, notches, protrusions, or apertures along its lower periphery that is stitched to the strobel 10 or any of 10AA-10I. The locating features of the upper 14 have a relative spacing identical to that of the locating features (e.g., the notches 93F) of the strobel 10 or any of 10AA-10I. During stitching, the operator can align the locating features of the upper 14 with those of the strobel 10. In FIG. 39, the upper 14 is shown with locating features (e.g., markings or apertures 93B) that can be aligned with locating features (e.g., notches 93F) of the strobel 10 or any of 10AA-10I for this purpose. Alternatively, or in addition, the last 84 can be configured with locating features that have the same relative spacing as the locating features of the strobel 10 or any of 10AA-10I. As shown in FIG. 42, the locating features 93C may be, for example, markings on or apertures in the last 84. In another embodiment, the last 84 could have markings that align with the weld pattern (e.g., the pattern of inwardly-protruding bonds 70) of the strobel 10 or any of 10AA-10I). It should be appreciated that the locating features on the strobel 10 have a slightly different relative spacing when the strobel 10 is in the uninflated state than when the strobel 10 is in the inflated state. Accordingly, the locating features on the strobel 10 may have a relative spacing in the inflated state that is identical to the relative spacing of the locating features on the last 84 if the strobel 10 is secured to the upper 14 when in the uninflated state and is placed on the last 84 when in the inflated state, as described herein.

Figure 44:
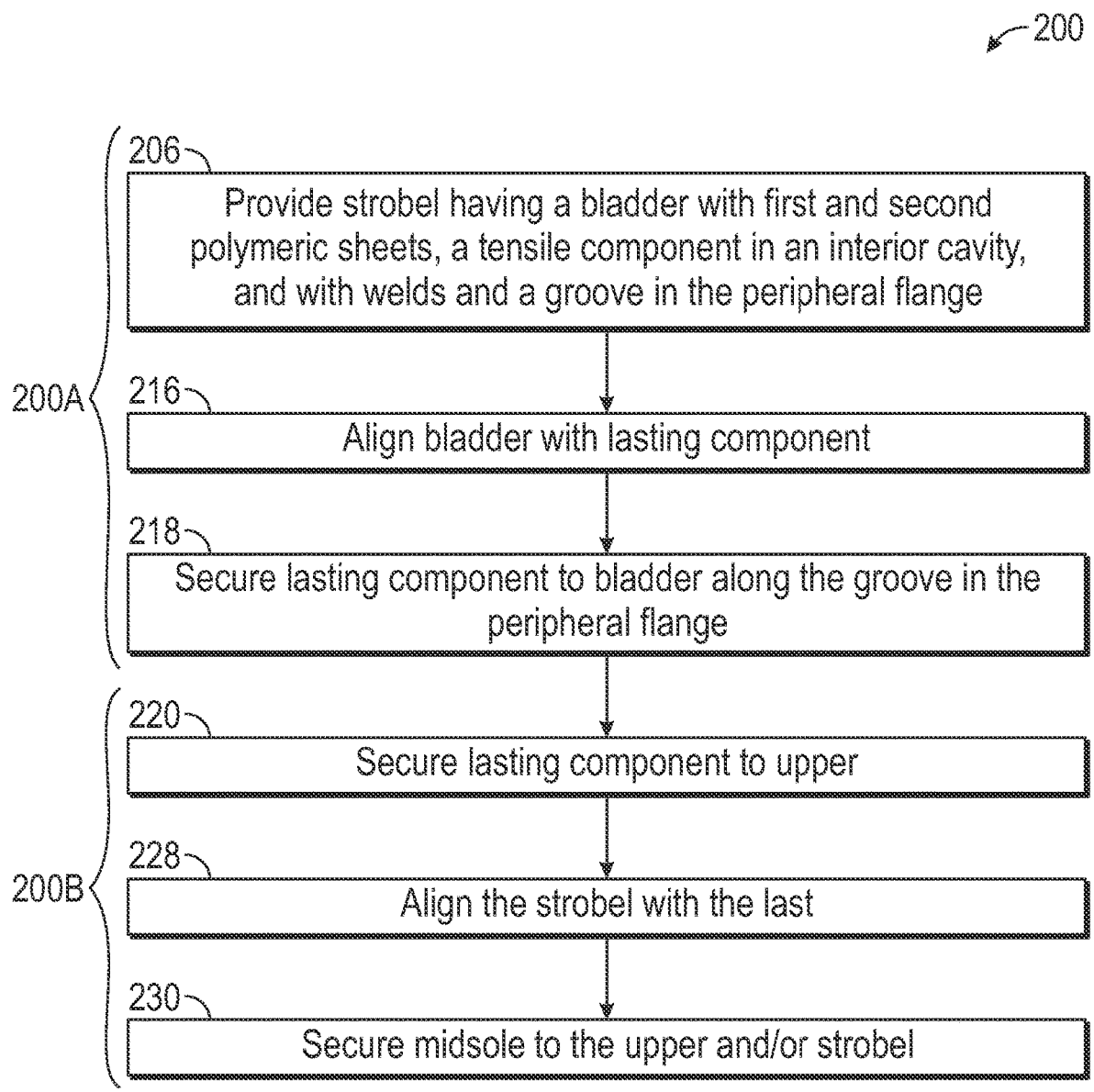
FIG. 44 is a flow diagram of a method of manufacturing footwear.

The steps of the method 200 of manufacturing footwear including any of the strobels 10, 10AA-10I and articles of footwear described herein, such as articles of footwear 12, 12A, 12C, 12D, are shown in the flowchart of FIG. 44. Portion 200A of the method 200 includes the step 206 of providing the strobel 10, 10AA-10I, etc. Providing the strobel may include forming the strobel. In other embodiments of the method 200, the strobel 10, 10AA-10I, etc., may be already in a formed state when provided in step 206 (e.g., the strobel may be obtained in a formed state under step 206). Accordingly, the entity providing the strobel may both form the strobel and assemble it in the footwear, or a separate entity may form the strobel and the entity carrying out the method 200 may obtain the formed strobel to carry out the method 200. The providing step 206 thus may or may not include forming the strobel.

In embodiments that include forming the strobel, step 206 may include a sub-step in which the second polymeric sheet 30 is placed on the tensile component 50. In other words, the tensile component 50 is between the polymeric sheets 28, 30.

Next, the step 206 may include a sub-step in which the first and second polymeric sheets 28, 30 are welded together at the first and second welds W1, W2 in the peripheral flange 20 to form the polymeric bladder 16 with the interior cavity 18, and, because the welds W1, W2 create the ridges 38, 40, the groove 22 is formed in the peripheral flange 20. As previously discussed, the welding may be radio frequency welding accomplished when the mold portions, such as mold portions 34A, 34B (and mold insert 34C), are closed together on the polymeric sheets 28, 30 and a power source 36 supplies energy creating an alternating electric field that heats the polymeric sheets 28, 30, creating welds where the mold portions 34A, 34B and/or mold insert 34C are applied to the polymeric sheets 28, 30.

Separately or simultaneously with welding the welds W1, W2, the portion 200A of the method 200 may include a sub-step of welding the inwardly-protruding bonds 70 by the radio frequency welding via the protrusions 72 of the mold insert 34C. For example, the inwardly-protruding bonds 70 will be provided simultaneously with the welds W1, W2 if the mold insert 34C is positioned in the mold cavity formed between the mold portions 34A, 34B when the mold portions 34A, 34B are closed together.

The portion 200A of the method 200 may include a step in which one or more locating features are provided on the strobel 10, such as notches 93A, protrusions 93H (see, e.g., strobel 10A) a weld pattern (e.g., the pattern of inwardly-protruding bonds 70) or markings (e.g., a printed pattern of alignment lines) or apertures, the markings or apertures both represented as locating features 93D. In some embodiments, the locating features may be provided during the radio frequency welding included in step 206 of providing the strobel as described. Alternatively, the notches 93A, protrusions 93H, or the apertures 93D could be cut, punched, printed, welded, or otherwise formed in a separate subsequent step.

For some of the strobels 10, 10AA, 10A, 10B, the portion 200A of the method 200 may include a step of cutting an aperture in the lasting component, such as apertures 19, 19A, 19B in lasting components 17, 17A, 17B, respectively.

The portion 200A of the method 200 may include a step of placing the polymeric bladder 16, 16A, 16B at the aperture 19, 19A, 19B, respectively. The portion 200A of the method 200 may include step 216, aligning the polymeric bladder with the lasting component, such as by aligning one or more locating features 93A of the polymeric bladder 16, 16A, 16B (such as notches, protrusions, a weld pattern, a printed pattern, an aperture) with one or more locating features 93G of the lasting component 17, 17A, 17B.

Once the polymeric bladder and the lasting component are aligned in step 216, the portion 200A of the method 200 may proceed to step 218, and the lasting component may be secured to the polymeric bladder, such as at the peripheral flange 20 or at the edges 90D, 90F, 90G, as described with respect to the different embodiments, such as by stitching a first series of stitches 81 through the lasting component and the polymeric bladder.

The method 200 of manufacturing footwear depicted in the flow diagram of FIG. 44 may include forming the strobel 10 according to the portion 200A of the method 200 of manufacturing a strobel 10 (e.g., may include steps 206-218) and then proceed to the portion 200B of the method 200 of manufacturing the article of footwear, or may include only the portion 200B of the method 200 of manufacturing the article of footwear by starting with a pre-formed strobel (e.g., beginning at step 220).

With reference to FIG. 39, locating features (e.g., notches 93F) of the strobel 10 may be aligned with locating features (e.g., apertures or markings 93B) of the upper 14, and then in step 220, the strobel 10 may be secured to the upper 14 such as by the series of stitches 82 extending through the lasting component, such as lasting component 17 in FIG. 39. The stitches 82 are referred to as a second series of stitches and may extend only through the lasting component and the upper 14 in some embodiments, such as in strobels 10, 10AA, 10A, 10B, 10C. In other embodiments, the stitches 82 may also extend through the polymeric bladder along the groove 22 in the peripheral flange 20 in some embodiments, such as in footwear 12A, 12C, and 12D of FIGS. 29, 31, and 34.

Prior to or contemporaneously with step 220, a protective cover layer 85 may be secured over the strobel 10 such as by stitching, as shown in FIG. 33. In an example embodiment, the protective cover layer 85 may be secured to the strobel 10 only at the flange 20, for example, with stitching at or near stitching 82. The stitching may be computer stitching or may be hand stitching.

Figure 41:
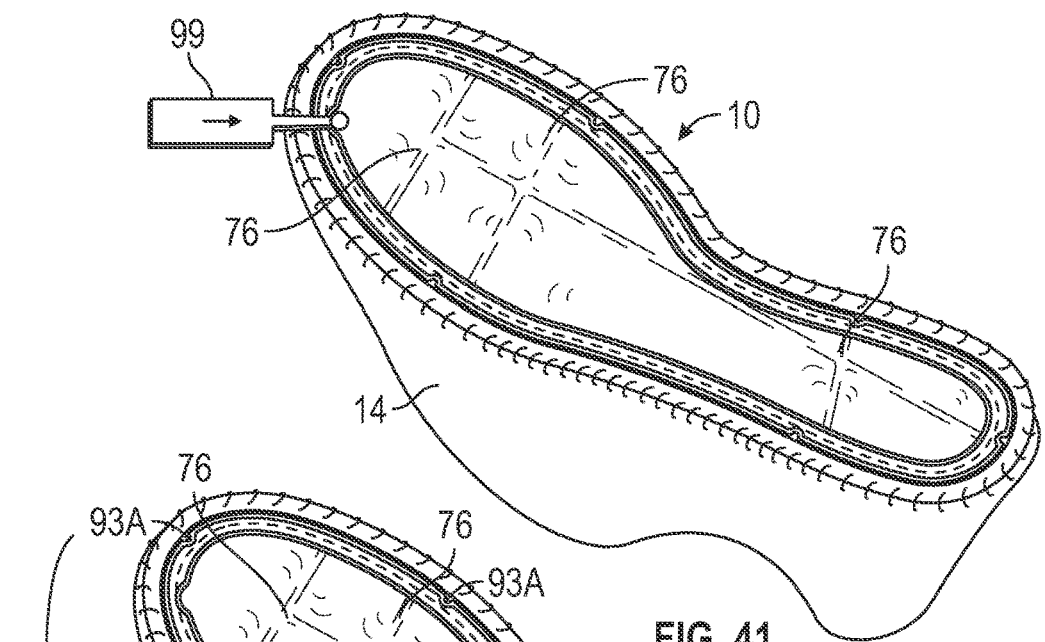
FIG. 41 is a schematic illustration of the strobel and upper of FIG. 40 during inflation of the strobel.

Next, the portion 200B of the method 200 may proceed to an inflation step in which the polymeric bladder is inflated as shown with respect to the bladder 16 in FIG. 41, such as by a source 99 of pressurized fluid, which may be nitrogen, air, or another gas. The method 200B may then proceed to a sealing step, in which the interior cavity 18 is sealed by sealing an inflation port or other opening in the polymeric bladder to retain the fluid in the interior cavity 18. Alternatively, if it is desired that the polymeric bladder 16 is at ambient pressure when the footwear 12 is assembled, the portion 200B of method 200 may skip the inflating step. An ambient polymeric bladder 16 may even be sealed by the welding of step 206, in which case the portion 200B of the method 200 may also skip the sealing step. In other embodiments, the bladder 16 may already be inflated before the portion 200B of the method 200 begins (e.g., the bladder 16 may already be inflated and sealed when provided under step 206).

The upper 14 with the strobel 10, 10AA, 10A, 10B, 10C, 10D, 10, 10F, 10G, 10H, or 10I stitched thereto may then be placed on the last 84. This may be by placing the last 84 into the opening 86 of the upper 14, or moving the upper 14 over the last 84 so that the last 84 is in the opening 86, as represented by FIG. 42 in which the upper 14 and strobel 10 are moved in the direction of arrow A. In step 228, which may occur simultaneously with placing the strobel 10 on the last 84 or may be subsequent to an adjustment of the strobel 10 on the last 84, the one or more locating features (e.g., notches 93A, protrusions 93H, pattern of inwardly-protruding bonds 70, printed alignment pattern, markings or apertures 93D) of the strobel are aligned with corresponding one or more locating features (e.g., markings or apertures 93C) of the last 84. There may be some predetermined tolerance range of the locating features on the last 84, such as by making the locating features on the last 84 larger than those on the strobel 10 or any of 10AA-10I, so that as long as the locating features of the strobel 10 or any of 10AA-10I to some extent overlap the locating features of the last 84, the components are considered to be sufficiently accurately aligned. If the locating features of the strobel 10 or any of 10AA-10I and the last 84 are not sufficiently aligned, however, the upper 14 with strobel 10 or any of 10AA-10I may be removed and then placed again onto the last 84 to see if better alignment can be achieved. If not, the strobel 10 or any of 10AA-10I and upper 14 are considered to be outside of the assembly tolerance range and may be recycled.

If step 228 is completed with the locating features of the strobel 10 and the last 84 successfully aligned, then the portion 200B of the method 200 may proceed to step 230, and the midsole 83 may be secured to the upper 14 and/or the strobel (such as strobel 10) while the upper 14 and strobel 10 are on the last 84. This is depicted in FIG. 43 by the movement of the midsole 83 in the direction of arrow B toward the strobel 10 and the upper 14. Adhesive may be applied to the midsole 83 and or to the strobel 10 and upper 14 where they interface with the midsole 83 to secure the midsole 83 to the upper 14, and/or the midsole 83 may be in a heated state that causes it to thermally bond to the strobel 10 and upper 14. In some embodiments, the assembled components may then be heated by placing them in a heater to activate the adhesive. An outsole or any other components of the sole structure 80 (not shown) may also secured to the midsole 83 or to the upper 14, and then the method 200 is complete.

FIG. 45 shows another embodiment of a bladder 316 that is alike in all aspects to bladder 16 except that inwardly-protruding bonds 70 are arranged in a different pattern. The bladder 316 can be secured to the lasting component 17 of FIG. 10 in the same manner as described with respect to bladder 16 to provide a strobel for securement to the upper 14. The bladder 316 is formed from first and second polymeric sheets with a tensile component 50 disposed between the sheets in a sealed interior cavity, and connecting inner surfaces of the sheets, as described with respect to strobel 10. As can be seen, some of the inwardly-protruding bonds 70 in the forefoot region are arranged parallel to one another and perpendicular to a longitudinally-extending one of the inwardly-protruding bonds 70. In the heel region, the inwardly-protruding bonds 70 are arranged to diverge from one another at an acute angle in a forward direction from a rear of the heel region. The inwardly-protruding bonds 70 result in a pattern of grooves 74 at the exterior surface of the bladder 316 that may enhance flexibility of the bladder 316 and may be used for alignment with the lasting component 17, the last 84, and/or the upper as discussed herein. As shown, the inwardly-protruding bonds 70 extend downward from the proximal surface 24 of the bladder 316. In other embodiments, the surface identified in FIG. 45 as the proximal surface could instead be the distal surface. For example, the bladder 316 resulting from the mold assembly of FIG. 46 could be used as a right-foot strobel with the inwardly-protruding bonds 70 extending downward from the proximal surface 24, or as a left-foot strobel with the inwardly-protruding bonds extending upward from the distal surface. The bladder 316 can be formed as described with respect to method 200 and can be used in the method of manufacturing footwear in the same manner as described with respect to bladder 316.

Figure 46:
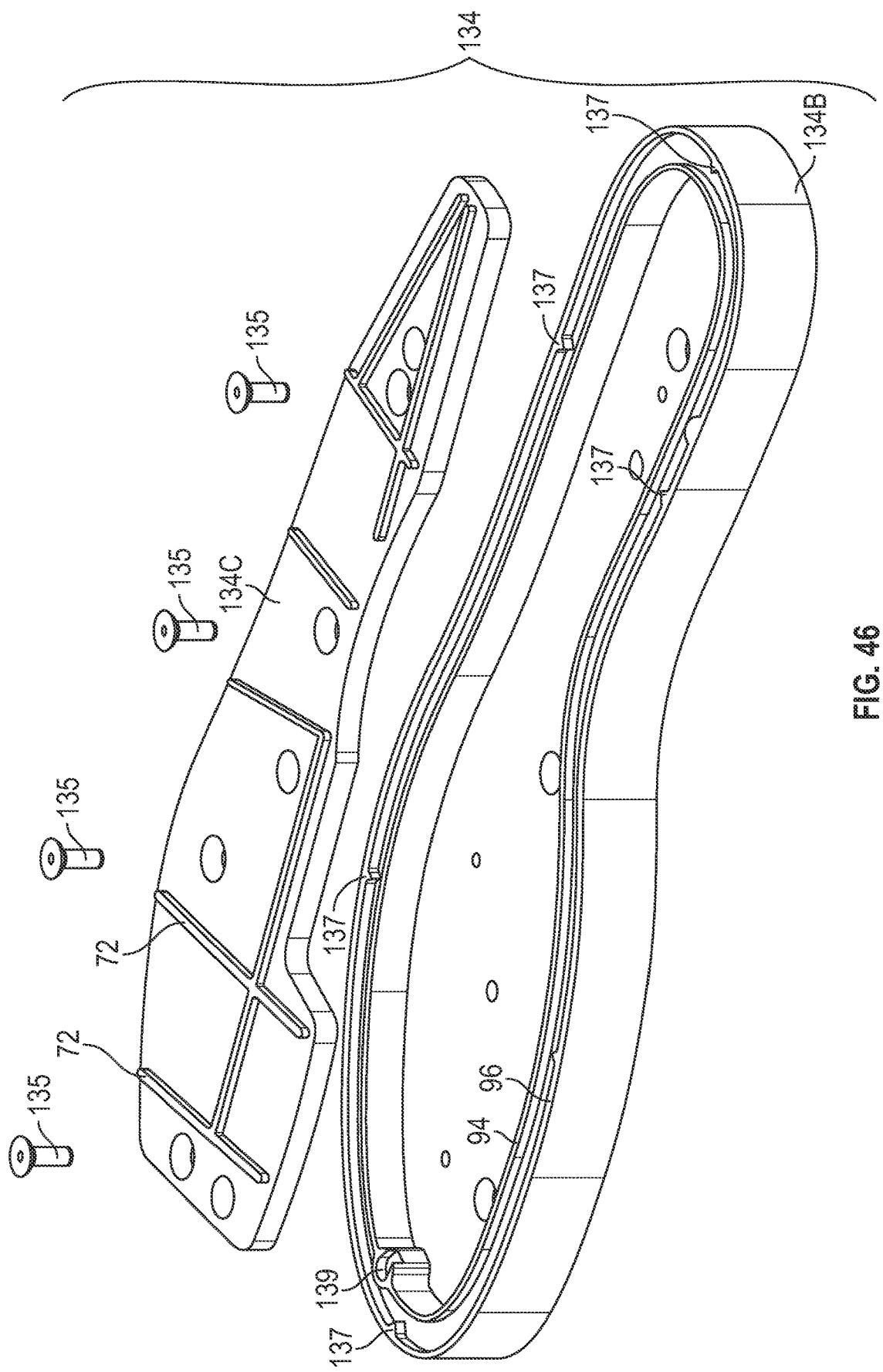
FIG. 46 is a schematic illustration in exploded view of a tooling assembly for the strobel of FIG. 45.

FIG. 46 shows a portion of a tooling assembly 134 that includes mold portion 134B and mold insert 134C. Fasteners 135 extend through openings in the mold insert 134C and into the mold portion 134B to secure the mold insert 134C to the mold portion 134B. An additional mold portion similar to mold portion 34A is closed together with mold portion 134B on the polymeric sheets 28, 30, with the tensile component 50 between the polymeric sheets 28, 30. The polymeric sheets 28, 30 and tensile component 50 are then welded by radio frequency welding (also referred to as high frequency or dielectric welding) or are secured by another manner of thermal or adhesive bonding, as a power source 36 supplies energy creating an alternating electric field that heats the polymeric sheets 28, 30 where the mold portions 34A, 134B or mold insert 134C are applied to the polymeric sheets 28, 30.

In the mold assembly of FIG. 46, the ridges 94, 96 of the mold portion 134B are applied to the same sheet as the protrusions 72 of the mold insert 134C. Accordingly, the welds W1, W2 are on the same side of the bladder 316 as are the inwardly-protruding bonds 70. Extensions 137 at the periphery of the mold portion 134B result in triangular markings (e.g., indentations) 93G in the flange 20 of the bladder 316. These markings can be used as locating features when aligning the bladder 316 with the upper 14 and/or with the last 84. In some embodiments, the flange 20 can be trimmed at these markings to create apertures that serve as locating features. The mold portion 134B also includes structure 139 that molds an inflation port into the bladder 316 that can be sealed after inflating the bladder 316.

The following Clauses provide example configurations of a strobel, an article of footwear, and a method of manufacturing disclosed herein.

Clause 1: An article of footwear comprising: a strobel including: a polymeric bladder defining an interior cavity and configured to retain a fluid in the interior cavity, the polymeric bladder having a peripheral flange extending around at least a portion of a perimeter of the interior cavity; wherein the peripheral flange defines a groove extending along the peripheral flange; a tensile component disposed in the interior cavity and secured to opposing inner surfaces of the polymeric bladder; and a lasting component configured to extend along the peripheral flange around the at least a portion of the perimeter of the interior cavity; wherein the lasting component is secured to the peripheral flange.

Clause 2: The article of footwear of clause 1, further comprising: an upper; and wherein the lasting component is secured the upper.

Clause 3: The article of footwear of clause 2, wherein: the polymeric bladder and the lasting component are each disposed in at least one different one of a forefoot region, a midfoot region, and a heel region of the article of footwear; the lasting component is secured to the polymeric bladder by a first series of stitches extending transversely across the polymeric bladder and the lasting component, and the lasting component; and the polymeric bladder is secured to the upper by a second series of stitches extending through the lasting component and through the polymeric bladder in the groove of the polymeric bladder.

Clause 4: The article of footwear of clause 2, wherein the lasting component is secured to the peripheral flange at the groove by a series of stitches extending through the lasting component and through the peripheral flange in the groove.

Clause 5: The article of footwear of clause 4, wherein the series of stitches are a first series of stitches; and wherein the lasting component is secured to the upper at a second series of stitches that extend through the lasting component and the upper.

Clause 6: The article of footwear of clause 1, wherein: the lasting component has an aperture; the polymeric bladder extends partially through the aperture; and the peripheral flange abuts the lasting component around the aperture.

Clause 7: The article of footwear of any of clauses 1-6, wherein: the peripheral flange has a first weld and a second weld spaced apart from the first weld; the first weld and the second weld extend lengthwise along the peripheral flange, and the groove extends lengthwise along the peripheral flange between the first weld and the second weld; the first weld is inward of the groove; and the second weld is outward of the groove.

Clause 8: The article of footwear of any of clauses 1-7, wherein the strobel has a locating feature that is at least one of a notch in or a protrusion at an outer edge of the peripheral flange or an outer edge of the lasting component, an aperture in the polymeric bladder or in the lasting component, a pattern of inwardly-protruding bonds of the polymeric bladder, a printed pattern on the polymeric bladder, or a marking on the polymeric bladder or on the lasting component.

Clause 9: The article of footwear of any of clauses 1-8, wherein: the polymeric bladder includes a first polymeric sheet and a second polymeric sheet; the first polymeric sheet is bonded to the second polymeric sheet at the peripheral flange; the tensile component includes a first tensile layer, a second tensile layer, and a plurality of tethers spanning the interior cavity from the first tensile layer to the second tensile layer and connecting the first tensile layer to the second tensile layer; and the first polymeric sheet is joined to the first tensile layer at a plurality of inwardly-protruding bonds that protrude inward from the first polymeric sheet only partially across the plurality of tethers toward the second polymeric sheet, and the polymeric bladder is narrowed at the inwardly-protruding bonds.

Clause 10: The article of footwear of any of clauses 1-9, wherein the lasting component is one of a woven or nonwoven textile, an elastomer or foam backed with a textile layer.

Clause 11: A method of manufacturing footwear comprising: providing a strobel formed by securing a lasting component to a peripheral flange of a polymeric bladder; wherein the polymeric bladder defines an interior cavity and is configured to retain a fluid in the interior cavity, and the peripheral flange extends around at least a portion of a perimeter of the interior cavity; wherein a tensile component is disposed in the interior cavity and is secured to opposing inner surfaces of the polymeric bladder; wherein the polymeric bladder has a groove that extends along the peripheral flange; and wherein the lasting component is configured to extend along the peripheral flange around the at least a portion of the perimeter of the interior cavity.

Clause 12: The method of clause 11, wherein securing the lasting component to the peripheral flange at the groove is by stitching the lasting component to the peripheral flange by a series of stitches extending through the lasting component and through the peripheral flange in the groove.

Clause 13: The method of any of clauses 11-12, further comprising: forming the polymeric bladder with the tensile component in the interior cavity by: placing the tensile component on a first polymeric sheet; placing a second polymeric sheet on the tensile component; and welding the first and second polymeric sheets to one another to define the peripheral flange and the groove.

Clause 14: The method of clause 13, wherein welding the first and second polymeric sheets to one another includes welding a first weld and a second weld spaced apart from one another and extending lengthwise along the peripheral flange, with the groove extending lengthwise along the peripheral flange between the first weld and the second weld.

Clause 15: The method of any of clauses 11-14, further comprising: aligning a locating feature of the polymeric bladder with a locating feature of the lasting component prior to securing the lasting component to the peripheral flange of the polymeric bladder; wherein the locating feature of the polymeric bladder is at least one of a notch in an outer edge of the peripheral flange, a protrusion at the outer edge of the peripheral flange, an aperture in the polymeric bladder, a pattern of inwardly-protruding bonds of the polymeric bladder, a printed pattern on the polymeric bladder, or a marking on the polymeric bladder.

Clause 16: The method of any of clauses 11-15, further comprising: securing the lasting component to an upper; wherein the strobel extends from a lateral side to a medial side of the upper.

Clause 17: The method of clause 16, wherein securing the lasting component to the upper is by stitching a perimeter of the lasting component to the upper with a series of stitches extending through the lasting component and the upper.

Clause 18: The method of clause 17, further comprising: securing the lasting component to the peripheral flange by a separate series of stitches prior to securing the lasting component to the upper.

Clause 19: The method of any of clauses 16-18, further comprising: aligning a locating feature on at least one of the lasting component or the polymeric bladder with a locating feature on a last; and inserting the last into the upper.

Clause 20: The method of clause 19, further comprising: securing a midsole to at least one of the upper, the lasting component, or the polymeric bladder while the upper, the lasting component, and polymeric bladder are on the last.

Clause 21: A strobel for an article of footwear, the strobel comprising: a polymeric bladder defining an interior cavity and configured to retain a fluid in the interior cavity, the polymeric bladder having a peripheral flange extending around at least a portion of a perimeter of the interior cavity; a tensile component disposed in the interior cavity and secured to opposing inner surfaces of the polymeric bladder; wherein the peripheral flange defines a groove extending along the peripheral flange; and a lasting component configured to extend along the peripheral flange around the at least a portion of the perimeter of the interior cavity; wherein the lasting component is secured to the peripheral flange.

Clause 22: The strobel of clause 21, wherein the lasting component is secured to the peripheral flange at the groove by a series of stitches extending through the lasting component and through the peripheral flange in the groove.

Clause 23: The strobel of any of clauses 21-22, wherein: the lasting component has an aperture; the polymeric bladder extends partially through the aperture; and the peripheral flange abuts the lasting component around the aperture.

Clause 24: The strobel of clause 23, wherein the lasting component has a forefoot region, a heel region, and a midfoot region between the forefoot region and the heel region, and the aperture and the polymeric bladder extend only in one of the forefoot region and the heel region or only in two contiguous ones of the forefoot region, the midfoot region, and the heel region.

Clause 25: The strobel of clause 23, wherein the lasting component has a forefoot region, a heel region, and a midfoot region between the forefoot region and the heel region, and the aperture and the polymeric bladder extend in each of the forefoot region, the midfoot region, and the heel region.

Clause 26: The strobel of clause 21, wherein the lasting component extends across the polymeric bladder between a medial side of the polymeric bladder and a lateral side of the polymeric bladder.

Clause 27: The strobel of any of clauses 21-26, wherein: the peripheral flange has a first weld and a second weld spaced apart from the first weld; the first weld and the second weld extend lengthwise along the peripheral flange, and the groove extends lengthwise along the peripheral flange between the first weld and the second weld; the first weld is inward of the groove; and the second weld is outward of the groove.

Clause 28: The strobel of clause 27, wherein: the peripheral flange includes a first ridge protruding at an outer surface of the peripheral flange between the first weld and the groove; and the peripheral flange includes a second ridge protruding at the outer surface of the peripheral flange between the second weld and the groove.

Clause 29: The strobel of any of clauses 21-28, wherein the strobel has a locating feature that is at least one of a notch in an outer edge of the peripheral flange or in an outer edge of the lasting component, an aperture in the polymeric bladder or in the lasting component, a pattern of inwardly-protruding bonds of the polymeric bladder, a printed pattern on the polymeric bladder, or a marking on the polymeric bladder or on the lasting component.

Clause 30: The strobel of any of clauses 21-29, wherein: the polymeric bladder includes a first polymeric sheet and a second polymeric sheet; the first polymeric sheet is bonded to the second polymeric sheet at the peripheral flange; the tensile component includes a first tensile layer, a second tensile layer, and a plurality of tethers spanning the interior cavity from the first tensile layer to the second tensile layer and connecting the first tensile layer to the second tensile layer; and the first polymeric sheet is joined to the first tensile layer at a plurality of inwardly-protruding bonds that protrude inward from the first polymeric sheet only partially across the plurality of tethers toward the second polymeric sheet, and the polymeric bladder is narrowed at the inwardly-protruding bonds.

Clause 31: The strobel of clause 30, wherein each of the inwardly-protruding bonds extends generally straight along an outer surface of the first polymeric sheet, and the inwardly-protruding bonds are arranged parallel or orthogonal relative to one another at the outer surface of the first polymeric sheet.

Clause 32: The strobel of any of clauses 21-31, wherein the lasting component is one of a woven or non-woven textile, an elastomer or foam backed with a textile layer.

Clause 33: An article of footwear comprising: an upper; a strobel including: a polymeric bladder defining an interior cavity and configured to retain a fluid in the interior cavity, the polymeric bladder having a peripheral flange extending around at least a portion of a perimeter of the interior cavity; a tensile component disposed in the interior cavity and secured to opposing inner surfaces of the polymeric bladder; wherein the peripheral flange defines a groove extending along the peripheral flange; a lasting component configured to extend along the peripheral flange around the at least a portion of the perimeter of the interior cavity; wherein the lasting component is secured to the peripheral flange; and wherein the lasting component is secured the upper.

Clause 34: The article of footwear of clause 33, wherein the polymeric bladder and the lasting component are each disposed in at least one different one of a forefoot region, a midfoot region, and a heel region of the article of footwear, the lasting component is secured to the polymeric bladder by a first series of stitches extending transversely across the polymeric bladder and the lasting component, and the lasting component and the polymeric bladder are secured to the upper by a second series of stitches extending through the lasting component and through the polymeric bladder in the groove of the polymeric bladder.

Clause 35: The article of footwear of clause 33, wherein the lasting component is secured to the peripheral flange at the groove by a series of stitches extending through the lasting component and through the peripheral flange in the groove.

Clause 36: The article of footwear of clause 35, wherein the series of stitches is a first series of stitches; and wherein the lasting component is secured to the upper at a second series of stitches that extends through the lasting component and the upper.

Clause 37: The article of footwear of clause 36, wherein the second series of stitches extends only through the upper and the lasting component.

Clause 38: The article of footwear of clause 36, wherein the second series of stitches further extends through the peripheral flange in the groove.

Clause 39: The article of footwear of clause 36, wherein: the lasting component has an aperture; the polymeric bladder extends partially through the aperture; and the peripheral flange abuts the lasting component around the aperture.

Clause 40: The article of footwear of clause 39, wherein the lasting component has a forefoot region, a heel region, and a midfoot region between the forefoot region and the heel region, and the aperture and the polymeric bladder extend only in one of the forefoot region and the heel region or only in two contiguous ones of the forefoot region, the midfoot region, and the heel region.

Clause 41: The article of footwear of clause 39, wherein the lasting component has a forefoot region, a heel region, and a midfoot region between the forefoot region and the heel region, and the aperture and the polymeric bladder extend in each of the forefoot region, the midfoot region, and the heel region.

Clause 42: The article of footwear of clause 43, wherein the lasting component extends across the polymeric bladder between a medial side of the polymeric bladder and a lateral side of the polymeric bladder.

Clause 43: The article of footwear of clause 42, wherein the lasting component overlays the polymeric bladder.

Clause 44: The article of footwear of any of clauses 33-43, wherein: the peripheral flange has a first weld and a second weld spaced apart from the first weld; the first weld and the second weld extend lengthwise along the peripheral flange, and the groove extends lengthwise along the peripheral flange between the first weld and the second weld; the first weld is inward of the groove; and the second weld is outward of the groove.

Clause 45: The article of footwear of clause 44, wherein: the peripheral flange includes a first ridge protruding at an outer surface of the peripheral flange between the first weld and the groove; and the peripheral flange includes a second ridge protruding at the outer surface of the peripheral flange between the second weld and the groove.

Clause 46: The article of footwear of any of clauses 33-45, wherein the strobel has a locating feature that is at least one of a notch in an outer edge of the peripheral flange or in an outer edge of the lasting component, an aperture in the polymeric bladder or in the lasting component, a pattern of inwardly-protruding bonds of the polymeric bladder, a printed pattern on the polymeric bladder, or a marking on the polymeric bladder or on the lasting component.

Clause 47: The article of footwear of any of clauses 33-46, wherein: the polymeric bladder includes a first polymeric sheet and a second polymeric sheet; the first polymeric sheet is bonded to the second polymeric sheet at the peripheral flange; the tensile component includes a first tensile layer, a second tensile layer, and a plurality of tethers spanning the interior cavity from the first tensile layer to the second tensile layer and connecting the first tensile layer to the second tensile layer; and the first polymeric sheet is joined to the first tensile layer at a plurality of inwardly-protruding bonds that protrude inward from the first polymeric sheet only partially across the plurality of tethers toward the second polymeric sheet, and the polymeric bladder is narrowed at the inwardly-protruding bonds.

Clause 48: The article of footwear of clause 47, wherein each of the inwardly-protruding bonds extends generally straight along an outer surface of the first polymeric sheet, and the inwardly-protruding bonds are arranged parallel or orthogonal relative to one another at the outer surface of the first polymeric sheet.

Clause 49: The article of footwear of any of clauses 33-48, wherein the lasting component is one of a woven or nonwoven textile, an elastomer or foam backed with a textile layer.

Clause 50: The article of footwear of any of clauses 33-49, further comprising: a midsole secured to at least one of the upper, the lasting component, or the polymeric bladder.

Clause 51: A method of manufacturing footwear comprising: forming a strobel by securing a lasting component to a peripheral flange of a polymeric bladder; wherein the polymeric bladder defines an interior cavity and is configured to retain a fluid in the interior cavity, and the peripheral flange extends around at least a portion of a perimeter of the interior cavity; wherein a tensile component is disposed in the interior cavity and is secured to opposing inner surfaces of the polymeric bladder; wherein the polymeric bladder has a groove that extends along the peripheral flange; and wherein the lasting component is configured to extend along the peripheral flange around the at least a portion of the perimeter of the interior cavity.

Clause 52: The method of clause 51, wherein securing the lasting component to the peripheral flange at the groove is by stitching the lasting component to the peripheral flange by a series of stitches extending through the lasting component and through the peripheral flange in the groove.

Clause 53: The method of clause 51, further comprising: prior to securing the lasting component to the peripheral flange, placing the polymeric bladder at an aperture in the lasting component so that the polymeric bladder extends partially through the aperture and the peripheral flange abuts the lasting component around the aperture.

Clause 54: The method of clause 53, further comprising: prior to placing the polymeric bladder at the aperture in the lasting component, cutting the aperture in the lasting component.

Clause 55: The method of any of clauses 51-54, further comprising: manufacturing the polymeric bladder with the tensile component in the interior cavity by: placing the tensile component on a first polymeric sheet; placing a second polymeric sheet on the tensile component; and welding the first and second polymeric sheets to one another to define the peripheral flange and the groove.

Clause 56: The method of clause 55, wherein welding the first and second polymeric sheets to one another includes welding a first weld and a second weld spaced apart from one another and extending lengthwise along the peripheral flange, with the groove extending lengthwise along the peripheral flange between the first weld and the second weld.

Clause 57: The method of any of clauses 51-56, further comprising: aligning a locating feature of the polymeric bladder with a locating feature of the lasting component prior to securing the lasting component to the peripheral flange of the polymeric bladder; wherein the locating feature of the polymeric bladder is at least one of a notch in an outer edge of the peripheral flange, an aperture in the polymeric bladder, or a marking on the polymeric bladder.

Clause 58: The method of any of clauses 51-57, wherein securing the lasting component to the peripheral flange of the polymeric bladder occurs with the polymeric bladder in an uninflated state.

Clause 59: A method of manufacturing footwear comprising: securing a lasting component to an upper; wherein the lasting component is secured to a peripheral flange of a polymeric bladder, the lasting component and the polymeric bladder together forming a strobel that extends from a lateral side to a medial side of the upper; wherein the polymeric bladder defines an interior cavity and is configured to retain a fluid in the interior cavity, and the peripheral flange extends around at least a portion of a perimeter of the interior cavity; wherein a tensile component is disposed in the interior cavity and is secured to opposing inner surfaces of the polymeric bladder; wherein the peripheral flange has a groove extending along the peripheral flange; and wherein the lasting component is configured to extend along the peripheral flange around the at least a portion of the perimeter of the interior cavity.

Clause 60: The method of clause 59, wherein securing the lasting component to the upper is by stitching a perimeter of the lasting component to the upper with a series of stitches extending through the lasting component and the upper.

Clause 61: The method of clause 60, wherein the series of stitches further extends through the peripheral flange in the groove.

Clause 62: The method of clause 60, further comprising: securing the lasting component to the peripheral flange by a separate series of stitches prior to securing the lasting component to the upper.

Clause 63: The method of any of clauses 60-62, wherein the polymeric bladder is in an uninflated state when the lasting component is stitched to the upper, and further comprising: inflating the polymeric bladder after the lasting component is stitched to the upper; and sealing the interior cavity after inflating the interior cavity.

Clause 64: The method of clause 63, further comprising: after sealing the interior cavity, inserting a last into the upper.

Clause 65: The method of clause 64, further comprising: aligning a locating feature on at least one of the lasting component or the polymeric bladder with a locating feature on the last.

Clause 66: The method of clause 64, further comprising: securing a midsole to at least one of the upper, the lasting component, or the polymeric bladder while the upper, the lasting component, and polymeric bladder are on the last.

Clause 67: The method of clause 66, wherein securing the midsole to at least one of the upper, the lasting component, or the polymeric bladder is by one or more of stitching, thermal bonding, adhesive bonding.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of manufacturing footwear comprising:
   forming a polymeric bladder with a tensile component in an interior cavity by:
   placing the tensile component on a first polymeric sheet;
   placing a second polymeric sheet on the tensile component; and
   welding the first and second polymeric sheets to one another to define a peripheral flange and a groove that extends along the peripheral flange;
   wherein welding the first and second polymeric sheets to one another includes welding a first weld and a second weld spaced apart from one another and extending lengthwise along the peripheral flange, with the groove extending lengthwise along the peripheral flange between the first weld and the second weld; and
   providing a strobel formed by securing a lasting component to the peripheral flange of the polymeric bladder;
   wherein the polymeric bladder defines the interior cavity and is configured to retain a fluid in the interior cavity, and the peripheral flange extends around at least a portion of a perimeter of the interior cavity;
   wherein the tensile component is disposed in the interior cavity and is secured to opposing inner surfaces of the polymeric bladder;
   wherein the lasting component is configured to extend along the peripheral flange around the at least a portion of the perimeter of the interior cavity.

2. The method of claim 1, wherein securing the lasting component to the peripheral flange at the groove is by stitching the lasting component to the peripheral flange by a series of stitches extending through the lasting component and through the peripheral flange in the groove.

3. The method of claim 1, further comprising:
   aligning a locating feature of the polymeric bladder with a locating feature of the lasting component prior to securing the lasting component to the peripheral flange of the polymeric bladder;
   wherein the locating feature of the polymeric bladder is at least one of a notch in an outer edge of the peripheral flange, a protrusion at the outer edge of the peripheral flange, an aperture in the polymeric bladder, a pattern of inwardly-protruding bonds of the polymeric bladder, a printed pattern on the polymeric bladder, or a marking on the polymeric bladder.

4. The method of claim 1, further comprising:
   securing the lasting component to an upper; wherein the strobel extends from a lateral side to a medial side of the upper.

5. The method of claim 4, wherein securing the lasting component to the upper is by stitching a perimeter of the lasting component to the upper with a series of stitches extending through the lasting component and the upper.

6. The method of claim 5, further comprising:
   securing the lasting component to the peripheral flange by a separate series of stitches prior to securing the lasting component to the upper.

7. The method of claim 4, further comprising:
   aligning a locating feature on at least one of the lasting component or the polymeric bladder with a locating feature on a last; and
   inserting the last into the upper.

8. The method of claim 7, further comprising:
   securing a midsole to at least one of the upper, the lasting component, or the polymeric bladder while the upper, the lasting component, and the polymeric bladder are on the last.

* * * * *